US012602433B2

(12) United States Patent
Schilders

(10) Patent No.: US 12,602,433 B2
(45) Date of Patent: Apr. 14, 2026

(54) MESSAGE MANAGEMENT USING GRAPH-BASED MODELS

(71) Applicants: INFOSYS LIMITED, Bangalore (IN); INVERTIT INC., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 18/585,299

(22) Filed: Feb. 23, 2024

(65) Prior Publication Data
US 2024/0289390 A1      Aug. 29, 2024

Related U.S. Application Data

(60) Provisional application No. 63/449,224, filed on Mar. 1, 2023, provisional application No. 63/448,738, filed on Feb. 28, 2023, provisional application No. 63/448,747, filed on Feb. 28, 2023, provisional application No. 63/448,861, filed on Feb. 28, 2023, provisional application No. 63/448,831, filed on Feb. 28, 2023.

(51) Int. Cl.
*G06F 16/90*          (2019.01)
*G06F 16/901*        (2019.01)
(52) U.S. Cl.
CPC ................................ *G06F 16/9024* (2019.01)

(58) Field of Classification Search
CPC .................................................. G06F 16/9024
See application file for complete search history.

(56) References Cited

U.S. PATENT DOCUMENTS 11,815,943 B1 * 11/2023 Rosendahl .............. G06F 9/547
2023/0023655 A1 * 1/2023 Hui ..................... G06F 3/04845

* cited by examiner

*Primary Examiner* — Kristopher Andersen
(74) *Attorney, Agent, or Firm* — Finnegan, Henderson, Farabow, Garrett & Dunner, LLP

(57) ABSTRACT

An overlay system is provided that includes a storage element and processing circuitry. The storage element stores an executable graph-based model that includes various executable nodes that communicate with each other by way of messages. The executable graph-based model further includes a message node for each message associated with the overlay system. Each message node is associated with one or more analytics overlay nodes that execute a corresponding set of analytics operations on composition of the corresponding message node to generate one or more analytic insights. The composition includes data and transactional information associated with the corresponding message node. A publisher overlay node associated with the one or more analytics overlay nodes may generate and publish an analytics outcome based on an output of the execution of the set of analytics operations. The analytics outcome is indicative of performance of the overlay system.

20 Claims, 15 Drawing Sheets

1400

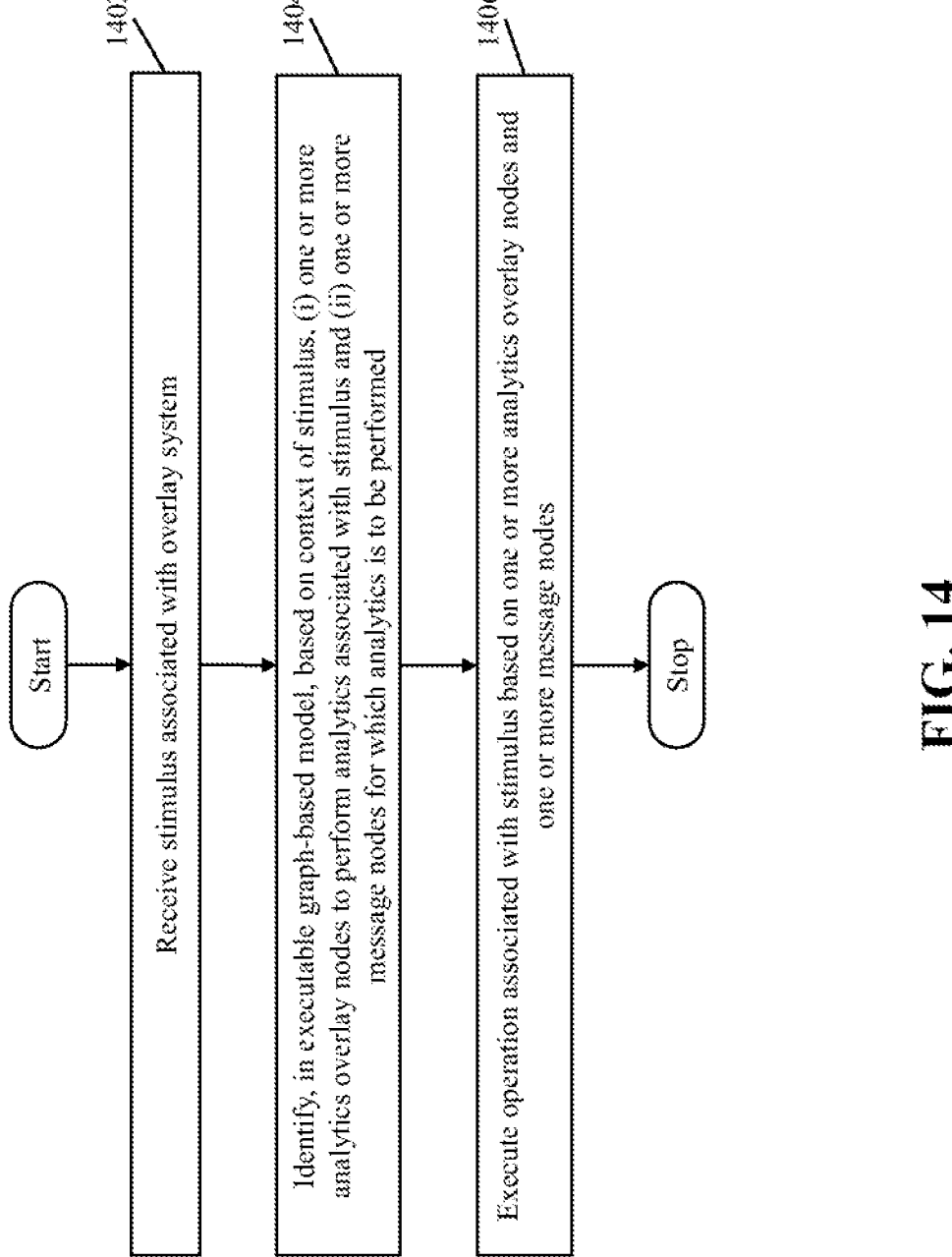

1402

Receive stimulus associated with overlay system

1404

Identify, in executable graph-based model, based on context of stimulus, (i) one or more analytics overlay nodes to perform analytics associated with stimulus and (ii) one or more message nodes for which analytics is to be performed

1406

Execute operation associated with stimulus based on one or more analytics overlay nodes and one or more message nodes Start Stop

MESSAGE MANAGEMENT USING GRAPH-BASED MODELS

CROSS-REFERENCE TO RELATED APPLICATIONS/INCORPORATION BY REFERENCE

This patent application refers to, claims priority to, and claims the benefit of U.S. Provisional Patent Application Ser. Nos. 63/449,224, filed Mar. 1, 2023; 63/448,747, filed Feb. 28, 2023; 63/448,738, filed Feb. 28, 2023; 63/448,861, filed Feb. 28, 2023; and 63/448,831, filed Feb. 28, 2023, the contents of which are hereby incorporated herein by reference in their entirety.

FIELD OF THE DISCLOSURE

Various embodiments of the present disclosure relate generally to graph-based models. More specifically, various embodiments of the present disclosure relate to message management using executable graph-based models.

BACKGROUND

Led by exponential growth, technology has found its application in many areas such as home security, assembly pipeline, robotics, inventory management, or the like. Such areas use technology to perform one or more tasks associated therewith. Such tasks are performed by modules that communicate with each other by way of messages. Further, troubleshooting or optimization of such modules is required to be performed periodically or when required, in order to improve performance thereof. Such troubleshooting or optimization is performed by analysing messages communicated among the modules.

Traditionally, such analysis of messages is performed by a separate analytics system that analyses the messages communicated by the modules and generates analytics information associated with the modules. Further, based on the analytics information, functionalities of the modules are modified in order to optimize performance thereof. However, such an approach to analyse messages is not optimal as sometimes the analytics information generated by the analytics system becomes outdated before it gets implemented. Notably, use of such outdated analytics information may be harmful rather than beneficial to the modules. Moreover, the messages are to be communicated from a native system associated with the modules to the analytics system. Hence, such communication is dependent on network availability. Further, the analysis of messages is not performed in real-time, hence, any measure to be taken to troubleshoot or optimize the performance of the modules gets delayed. Therefore, time that could have been productive gets spent waiting for the analytics information. Consequently, such an analytics system is inefficient and often causes a loss of time and money due to delays in the generation of analytics information.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating message management using an executable graph-based model are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 14 is a flowchart that illustrates a method for facilitating message management using the executable graph-based model, in accordance with an embodiment of the present disclosure.

DETAILED DESCRIPTION

Figure 1:
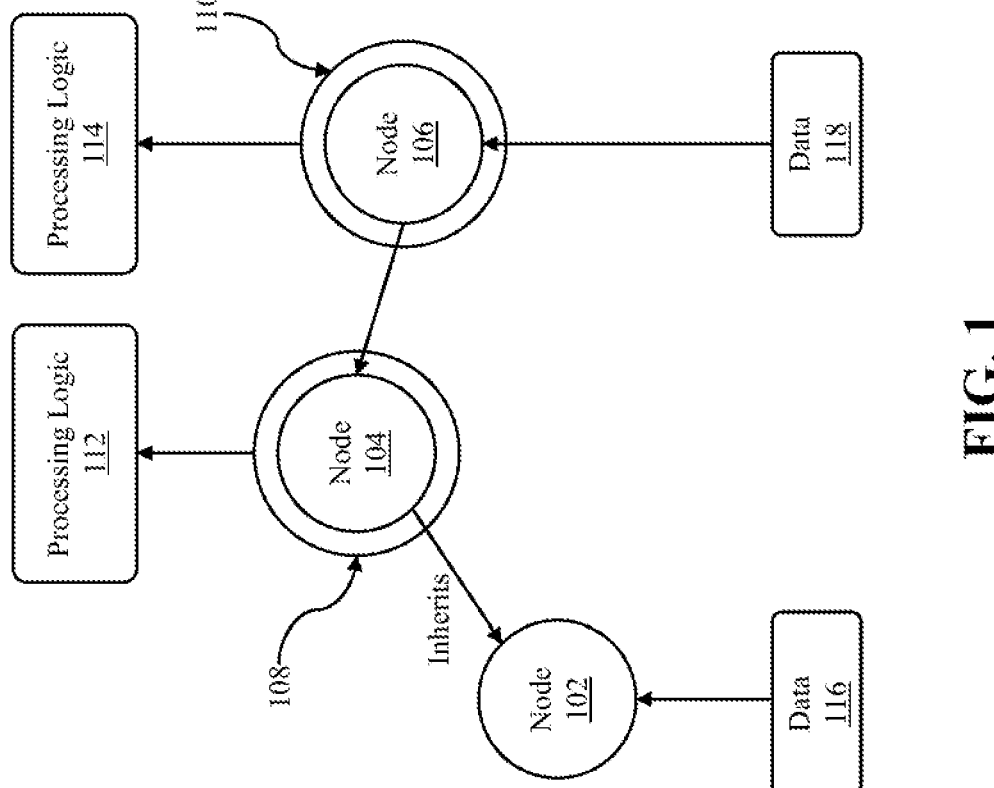
FIG. 1 is a graph that illustrates a composition of an executable graph-based model, in accordance with an embodiment of the present disclosure.
Figure 1:

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Digitization in various domains (for example, industrial processes, security systems, production pipelines, and so forth) has led systems associated with such domains to employ various intelligent and unintelligent modules. Such modules facilitate one or more tasks associated with the corresponding systems. To facilitate the tasks, these modules are required to communicate with each other. Communication among the modules takes place by way of messages. Such messages include information (for example, a source module, a destination module, an action, data, or the like) associated with the tasks that are to be performed by the modules. Thus, such messages provide information regarding various aspects associated with the system. This information may be analysed to determine one or more insights that may be used for various purposes, for example, for improving the performance of the modules, for making changes in the corresponding system, or the like. Therefore, the messages being communicated among the modules are required to be analysed in order to determine an analytics output that is indicative of one or more analytics insights associated with the system.

Traditionally, an analytics system, that works in tandem with a system that is to be analysed, receives via a communication network, messages that are being communicated among modules of the system and stores the messages in a data warehouse. The stored messages are then analysed by the analytics system and based on the analysis, the one or more insights are generated. However, dependency on availability of the communication network may lead to unwanted delays in case of network breakdown. In some cases, such delays may also lead to the analytics output being outdated, and hence, being redundant. Further, the analysis of messages is not performed in real time. Therefore, the analytics output is also not provided to the native system in real-time, thereby restricting availability thereof in time for time-critical tasks. Moreover, the messages stored in the data warehouse are the only source of historical messages for the analytics system. In an instance, when the data warehouse is not accessible, the analytics system fails to perform any analytics that requires analyzing the historical messages. To summarize, the traditionally used analytics system for performing analytics of messages is inefficient and has several drawbacks that restrict the timely generation of analytics output.

The present disclosure is directed to facilitation of real-time analytics of messages using executable graph-based models of an overlay system. The executable graph-based models are customized hypergraphs having hyper-edges that include one or more roles and vertices that are realized by way of executable nodes. Each executable node is a base node that is extended by way of one or more overlays. Each executable node is associated with a particular node type. For example, an edge node corresponds to a base node with an edge node type. Nodes (for example, base nodes and executable nodes) are connected with other nodes by way of roles included in an edge node therebetween. In some embodiments, roles are represented by way of nodes of role node type. Role node between two nodes may be indicative of details regarding an association therebetween.

A system for which messages are to be analyzed may be integral to the executable graph-based model or may communicate messages to processing circuitry (for example, a controller module or a message management module) associated with the executable graph-based model. For each message that is to be analyzed, the processing circuitry may instantiate a message node, that represents the message, in the executable graph-based model. The message node may be extended by way of one or more analytics overlay nodes. The one or more analytics overlay nodes may perform analysis on the message represented by the message node based on a composition of the message node. A composition of each message node includes data and transactional information associated therewith. The composition of each message node is stored in vertex nodes associated therewith. The composition of each message node includes value shared attributes and non-value shared attributes. The vertex nodes that store value shared attributes are coupled with each message node that has corresponding attribute value in the composition thereof. Such representation of message nodes provides for a quick and easy search for messages to be analyzed. Subsequently, another overlay node (for example, a publisher overlay node) that is associated with the one or more analytics overlay nodes may generate the analytics outcome based on the analysis performed by the analytics overlay node. The analytics outcome is indicative of the analytics insight generated by the analytics overlay node. Notably, the present disclosure allows for facilitation of analytics of messages at a node level which allows a significant increase in the degree of parallelism with which messages are analyzed. Hence, the analysis of messages associated with the executable graph-based model and the generation of the analytics outcome based on such analysis requires significantly less time.

The traditional analytics system involves communication with an external analytics system, whereas, the present disclosure allows for performing analytics while eliminating a requirement of communicating with another system. Further, the traditional analytics system requires the messages to be stored at the data warehouse, whereas, the present disclosure does not require the message to be stored at any external data storage. Moreover, the traditional analytics system does not provide the analytics outcome in real-time, whereas, the present disclosure allows for generation of the analytics outcome in real-time or near real-time.

The systems and methods disclosed herein provide a solution for performing message management. Such message management is performed by executing analytics operations at a single message level. The systems and methods disclosed herein allow for instantiation of a message node for each message associated therewith. Further, each message node is associated with one or more analytics overlay nodes that may perform corresponding analytics on the composition of the corresponding message node. The association of analytics overlay nodes with the message nodes allows for different types of analytics (for example, descriptive analytics, diagnostic analytics, predictive analytics, prescriptive analytics, or the like) to be performed simultaneously. Hence, the disclosed methods and systems allow for analytics of messages to be performed in such a way that it allows for generation of real-time analytics outcome which may be used for improving performance of the overlay system.

Figure Description:

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively, of the executable graph-based model 100. Further, the overlays 108 and 110 of the nodes 104 and 106, respectively, provide the functionality to respond to stimuli and interact with, manipulate, or otherwise process the data for analytics based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2).

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required.

Figure 2:
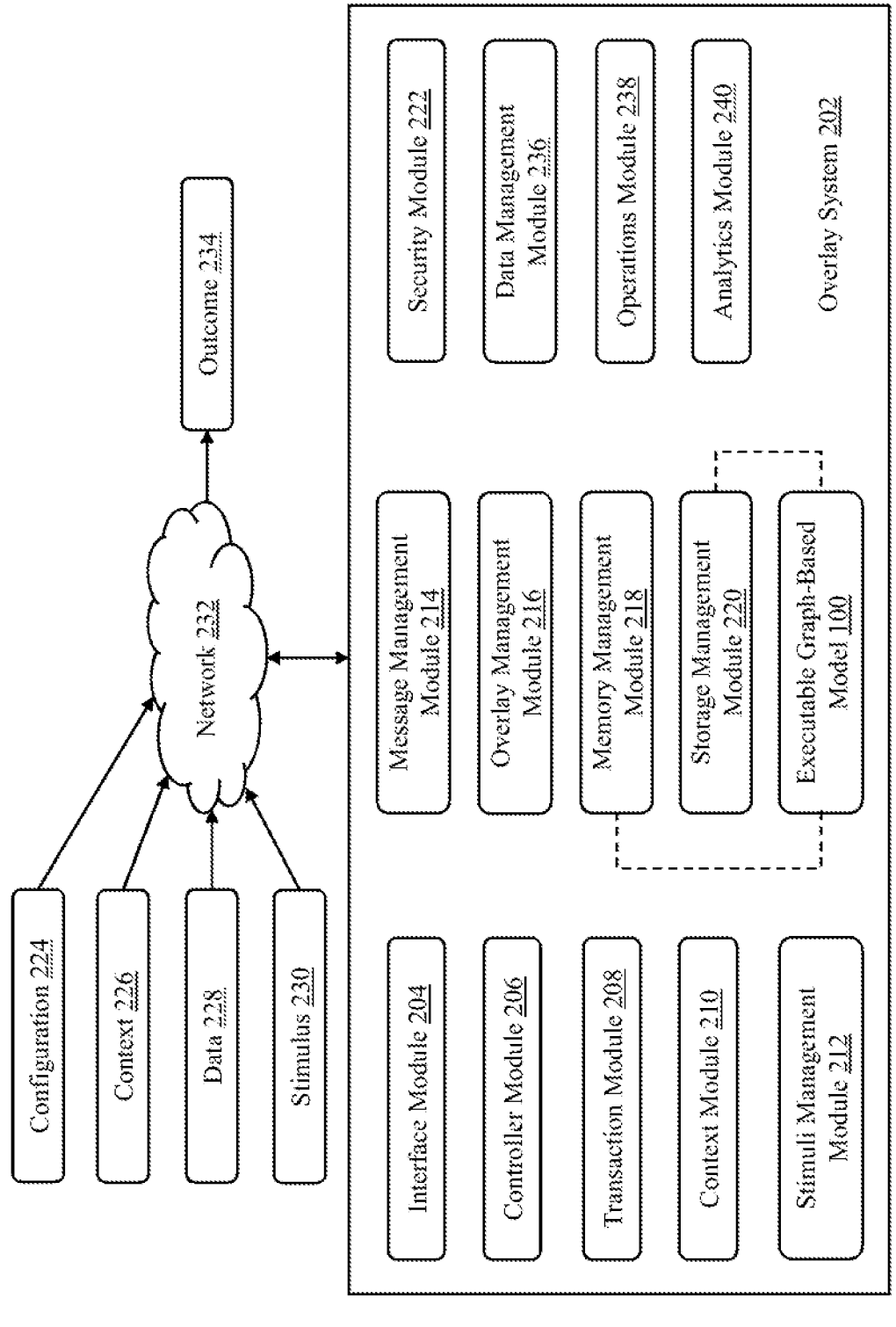
FIG. 2 is a block diagram that illustrates a system environment of an overlay system for execution, management, and configuration of executable graph-based models, in accordance with an embodiment of the present disclosure.

FIG. 2 is a block diagram that illustrates a system environment 200 of an overlay system 202 for execution, management, and configuration of executable graph-based models, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a message management module 214, an overlay management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes a data management module 236, an operations module 238, and an analytics module 240. In some embodiments, all the modules of the overlay system 202 except for the executable graph-based model 100 may collectively form processing circuitry that performs message management (for example, message analytics) within the overlay system 202.

The overlay system 202 may include suitable logic, circuitry, interfaces, and/or code, executable by the circuitry, that may be configured to facilitate message management in the executable graph-based models (such as the executable graph-based model 100). Message management in the overlay system 202 corresponds to performing analytics on message and non-message data associated with the overlay system 202 to generate one or more analytic insights based on which performance of a business solution associated with the overlay system 202 may be improved. The term 'performance' refers to the ability of the business solution associated with the overlay system 202 to fulfill one or more tasks assigned thereto. The tasks may be associated with a functionality that is to be performed by the business solution. The business solution associated with the overlay system 202 may refer to an application (for example, a business application, a robotic system, an autonomous vehicle system, an inventory system, a task assignment/allocation system, or the like) that may be implemented by way of the overlay system 202. Throughout the description, the phrase 'performance of the business solution implemented by way of the overlay system 202' is used synonymously to the phrase 'performance of the overlay system 202'.

The overlay system 202 includes the executable graph-based model 100 that corresponds to an application-specific combination of data and processing functionality which is manipulated, processed, and/or otherwise handled by the other modules within the overlay system 202 for performing analytics of messages based on the stimulus 230 received by the overlay system 202.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs produced by the overlay system 202, such as the outcome 234, are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to processing the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as user name, password, access token, device information, time stamp, one or more relevant identifiers (IDs), or the like, that are required for processing of messages within the executable graph-based model 100. Each context within the overlay system 202 may be extended to include additional information that is required for the processing of the message (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operational execution context to one or more other modules within the overlay system 202 to drive communication of one or more messages associated with the operational execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of messages associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on the execution of a message by any of its nodes. In some examples, the processing of a stimulus (such as the stimulus 230) results in the generation, communication, or processing of one or more messages that further result in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 and/or the analytics module 240 of the overlay system 202.

The message management module 214 may include suitable logic, circuitry, interfaces, and/or code, executable by the circuitry, configured to manage all data or information associated with messages communicated within the overlay system 202 (e.g., the data 228) for a given communication network implemented by way of the executable graph-based model 100. Operations performed by the message management module 214 include data loading, data unloading, data modeling, and data processing operations associated with the generation and communication of messages within the overlay system 202. The message management module 214 is communicatively coupled (e.g., connected either directly or indirectly) to one or more other modules within the overlay system 202 to complete some or all of these operations. For example, the storage of data or information associated with messages is handled in conjunction with the storage management module 220 (as described in more detail below).

The overlay management module 216 may include suitable logic, circuitry, interfaces, and/or code, executable by the circuitry, configured to manage all overlays within the overlay system 202. Operations performed by the overlay management module 216 include overlay storage management, overlay structure modeling, overlay logic creation and execution, and overlay loading and unloading (within the executable graph-based model 100). The overlay management module 216 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more of the modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100.

The storage management module 220 may include suitable logic, circuitry, interfaces, and/or code, executable by the circuitry, configured to manage the temporary or permanent storage of data associated with messages being communicated within the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses 'manifests' to manage the interactions between the storage device and the modules within the overlay system 202. In one embodiment, the storage management module 220 is communicatively coupled (e.g., connected either directly or indirectly) to one or more overlays within the executable graph-based model 100.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device. In the present disclosure, the executable graph-based model 100 may be stored in a storage element. The storage element corresponds to a combination of the memory management module 218 and storage management module 220 that may be configured to store the executable graph-based model 100. In some embodiments, the storage element may be a storage module that is managed by the memory management module 218 and storage management module 220, collectively.

The security module 222 may include suitable logic, circuitry, interfaces, and/or code, executable by the circuitry, configured to manage the security of the overlay system 202. This includes the security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation ('GDPR'). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the message management module 214 and the overlay management module 216 for managing and executing security-based overlays.

The data management module 236 may include suitable logic, circuitry, interfaces, and/or code, executable by the circuitry, configured to manage all data or information within the overlay system 202 (e.g., the data 228) for a given application. Operations performed by the data management module 236 include data loading, data unloading, data modeling, and data processing. The data management module 236 is communicatively coupled (e.g., connected either directly or indirectly) to one or more other modules within the overlay system 202 to complete some or all of these operations. For example, data storage is handled by the data management module 236 in conjunction with the storage management module 220.

The operations module 238 may include suitable logic, circuitry, interfaces, and/or code, executable by the circuitry, configured to track operational metrics and the behavior of all modules of the overlay system 202. Operational metrics of a module is indicative of statistics associated with performance of the module while performing an operation (for example, communication, data processing, stimulus processing, or the like). The performance of the module may be improved by taking one or more measures to improve operational metrics associated therewith. Such measures may be taken based on the one or more analytic insights that are indicative of the performance of the module.

The analytics module 240 may include suitable logic, circuitry, interfaces, and/or code, executable by the circuitry, configured to perform analytics of message and non-message data associated with the overlay system 202. The analytics module 240 may perform such analytics by way of one or more analytics overlay nodes. The analytics module 240 may perform descriptive analytics (e.g., 'What happened?'), diagnostic analytics (e.g., 'Why did it happen?'), predictive analytics (e.g., 'What is likely to happen?'), prescriptive analytics (e.g., 'What should be done?'), a combination of these, or any other type of analytics of message and non-message data associated with the overlay system 202.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

It will be apparent to a person skilled in the art that whilst only one executable graph-based model 100 is shown in FIG. 2, in other embodiments the overlay system 202 stores and maintains more than one executable graph-based model, without deviating from the scope of the present disclosure. In such embodiments, communication in each executable graph-based model is executed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3:
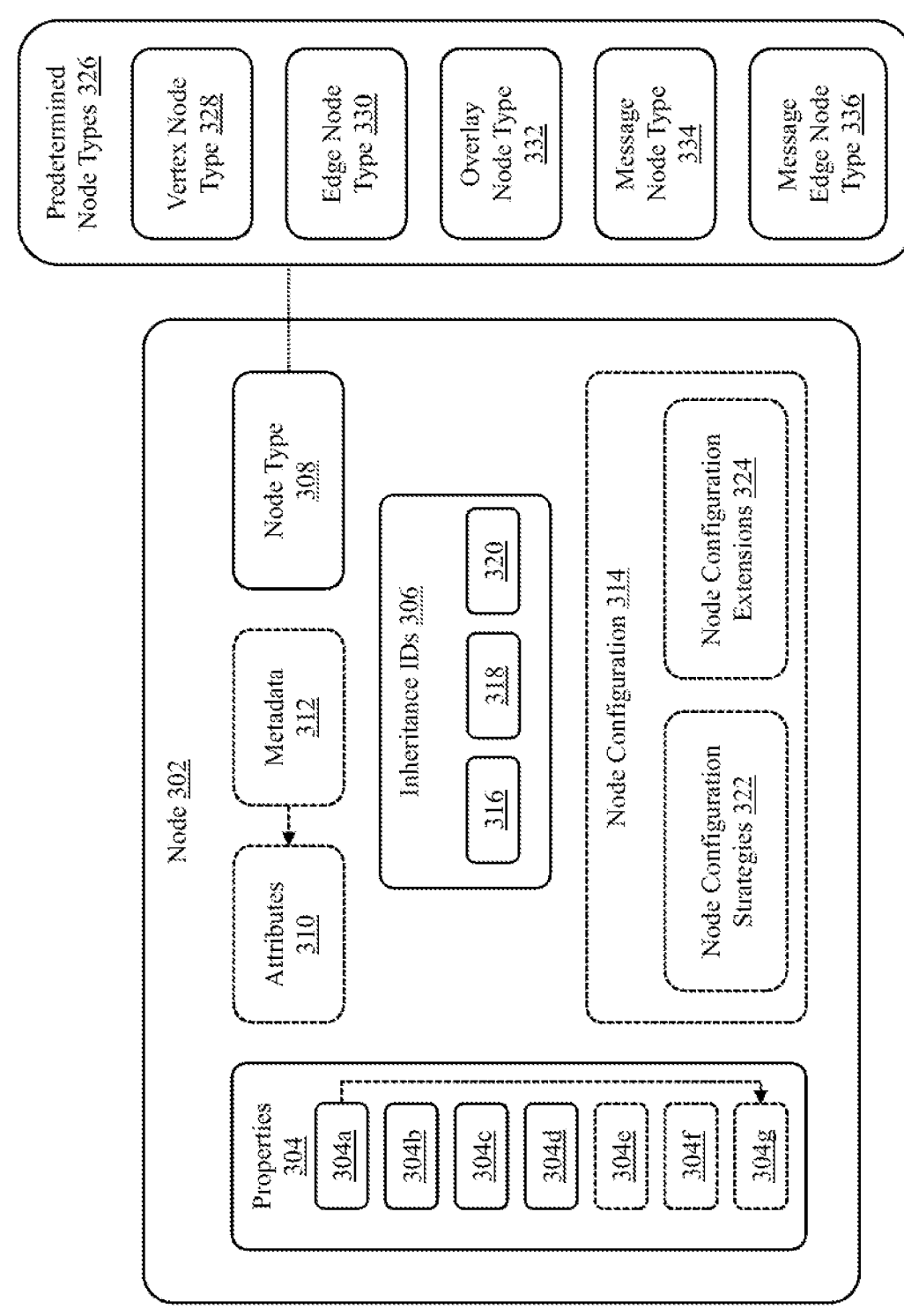
FIG. 3 is a block diagram that illustrates a generic structure of a node within the executable graph-based model of FIG. 1, in accordance with an embodiment of the present disclosure.

FIG. 3 is a block diagram 300 that illustrates a generic structure of a node 302 within the executable graph-based model 100, in accordance with an embodiment of the present disclosure. Referring to FIG. 3, the node 302 corresponds to the core structure of the executable graph-based model 100 and forms the foundational building block for all data and processing logic within the executable graph-based model 100. The node 302 includes properties 304, inheritance IDs 306, and a node type 308. The node 302 optionally includes one or more attributes 310, metadata 312 associated with the attributes 310, and a node configuration 314.

The properties 304 of the node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the node 302 include an abstract flag 316, a leaf flag 318, and a root flag 320. The node configuration 314 optionally includes one or more node configuration strategies 322 and one or more node configuration extensions 324. FIG. 3 further shows a plurality of predetermined node types 326 which include a vertex node type 328, an edge node type 330, an overlay node type 332, a message node type 334, and a message edge node type 336.

The unique ID 304a is unique for each node within the executable graph-based model 100. The unique ID 304a is used to register, manage, and reference the node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the node 302 is incremented when the node 302 undergoes transactional change. This allows the historical changes between versions of the node 302 to be tracked by modules or overlays within the overlay system 202. The namespace 304c of the node 302, along with the name 304d of the node 302, is used to help organize nodes within the executable graph-based model 100. That is, the node 302 is assigned a unique name 304d within the namespace 304c such that the name 304d of the node 302 need not be unique within the entire executable graph-based model 100, only within the context of the namespace 304c to which the node 302 is assigned. The node 302 optionally includes one or more icons 304e which are used to provide a visual representation of the node 302 when visualized via a user interface. The one or more icons 304e can include icons at different resolutions and display contexts such that the visualization of the node 302 is adapted to different display settings and contexts. The node 302 also optionally includes one or more labels 304f which are used to override the name 304d when the node 302 is rendered or visualized.

The node 302 supports the concept of inheritance of data and processing logic associated with any other node of the executable graph-based model 100 that is inherited by the node 302. This allows the behavior and functionality of the node 302 to be extended or derived from the inherited node of the executable graph-based model 100. The inheritance IDs 306 of the node 302 indicate the inheritance-based information, which may be applicable to the node 302. The inheritance IDs 306 comprise a set of Boolean flags which identify the inheritance structure of the node 302. The abstract flag 316 allows the node 302 to support the construct of abstraction. When the abstract flag 316 takes a value of 'true', the node 302 is flagged as abstract that is to say that it cannot be instantiated or created within an executable graph-based model (e.g., the executable graph-based model 100). Thus, in an instance when the node 302 has the abstract flag 316 set to 'true', the node 302 may only form the foundation of other nodes that inherit therefrom. By default, the abstract flag 316 of the node 302 is set to 'false'. The leaf flag 318 is used to indicate whether any other node may inherit from the node 302. If the leaf flag 318 is set to 'true', then no other node may inherit from the node 302 (but unlike an abstract node, a node with the leaf flag 318 set may be instantiated and created within the executable graph-based model 100). The root flag 320 is used to indicate whether the node 302 inherits from any other node. If the root flag 320 is set to 'true', the node 302 does not inherit from any other node. The node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the node 302 is used to extend the functionality of the node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the generation of specialized node functionalities for specific application areas. Such extensibility is not present in prior art graph-based models. As illustrated in FIG. 3, the node 302 and the node type 308 are one logical unit that is not separated in the context of an executing system at run-time (e.g., in the context of execution of an executable graph-based model).

FIG. 3 further shows the plurality of predetermined node types 326 which provides a non-exhaustive list of node types that may be associated with a node, such as the node 302. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example, objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node types 326 further includes the overlay node type 332, the message node type 334, and the message edge node type 336. As will be described in more detail below, a node with the overlay node type 332 is used to extend the functionality of a node, such as the node 302, to incorporate processing logic. Unlike non-overlay nodes, an overlay node includes processing logic which determines the functionality of the overlay node. The processing logic of an overlay node includes a block of executable code, or instructions, which carries out one or more operations associated with the communication of messages within the executable graph-based model 100. The block of executable code is pre-compiled code, code that requires interpretation at run-time, or a combination of both. Different overlay nodes provide different processing logic to realize different functionality. For example, a handler overlay node includes processing logic to receive a message and execute an operation associated with the received message, whilst a publishing overlay node includes processing logic to generate and publish a message based on the stimulus 230 received by the overlay system 202.

The overlay system 202 may have a set of messages associated therewith. A node with the message node type 334 represents a message of the set of messages associated with the overlay system 202. The processing circuitry may be configured to generate the executable graph-based model 100 based on the set of messages. Specifically, the processing circuitry may instantiate a message node for each message associated with the overlay system 202. Each node with the message node type 334 is associated with one or more nodes with the vertex node type 328 that store a composition thereof. The composition of a message node refers to data and transactional information (for example, message identifier, source identifier, message type, or the like) associated with the message that is represented by the corresponding node. A message node may be one of a command node, a query node, and an event node. The command node, the query node, and the event node may represent a command message, a query message, and an event message, respectively. The event message may be instantiated as an event header node or a handled event node. The event header node may represent an event message that may represent a source message of one or more handled event messages. The one or more handled event messages may be a clone of the event message represented by the event header node.

A node with the message edge node type 336 couples two message nodes by way of corresponding message roles. A message edge node establishes a causal association between two or more message nodes. A causal association between two message nodes is indicative of generation of one message node due to processing of another message node. That is to say, the message edge node that couples two or more message nodes establishes a correlation therebetween. Further, the message edge node includes one or more roles for each message node associated therewith. A message role associated with a message node may be one of 'command', 'query', and 'event'. For example, a command node may be coupled to an event node via a message edge node, where a role associated with the command node is 'command' and a role associated with the event node is 'event'.

In an instance, a message edge node may couple a command node with an event header node. In such an instance, the message edge node may be a command to event header edge. In an instance, a message edge node may couple an event header node with a handled event node. In such an instance, the message edge node may be an event header to handled event edge. In an instance, a message edge node may couple a query node with an event node. In such an instance, the message edge node may be a query to event edge. In an instance, a message edge node may couple a command node with an event node. In such an instance, the message edge node may be a command to event edge. Any combination of message-to-message edge is possible depending upon coupling of message types facilitated by the message edge node.

The one or more attributes 310 correspond to the data associated with the node 302 (e.g., the data represented by the node 302 within the executable graph-based model 100 as handled by the data management module 236). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, and a complex attribute behavior. The attribute behavior of each attribute defines the behavior of the corresponding attribute. The attribute behaviors of each attribute may be configured by associated attribute configurations. The attribute configurations are examples of attribute configuration extensions which are node configuration extensions (e.g., they are part of the one or more node configuration extensions 324 of the node 302 shown in FIG. 3). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the node 302 further includes the metadata 312 (e.g., data stored as a name, count of processed messages, time when last message was processed, an average processing time required for processing a message, or the like) which is associated with either the node 302 or an attribute (for example, the one or more attributes 310) of the node 302. An attribute within the one or more attributes 310 may either have an independent state or a shared state. That is to say that, an attribute may be a value shared attribute or a non-value shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the node 302, which creates message source IDs. A further example of a concrete node configuration strategy is a versioning strategy, associated with the configuration of the version ID 304b of the node 302, which supports major and minor versioning (depending on the type of transactional change incurred by the node 302). The versioning strategy may be adapted to a native filing system of a user device hosting the overlay system 202 or a third-party data storage (for example, Snowflake®, or the like) associated with the overlay system 202.

Figure 4:
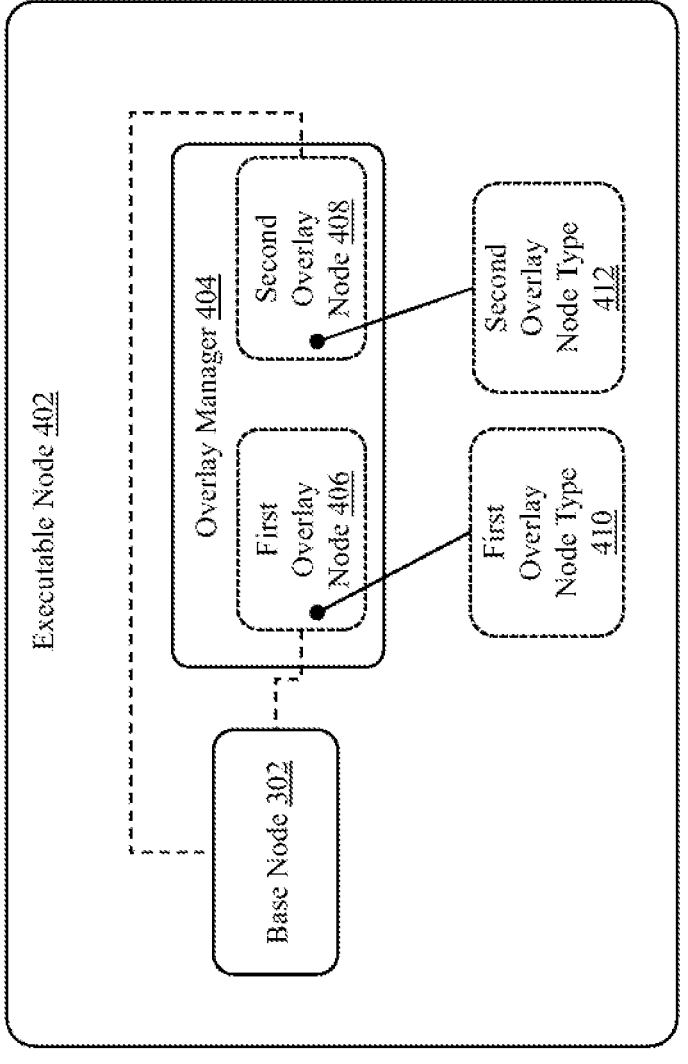
FIG. 4 is a block diagram that illustrates an executable node within the executable graph-based model, in accordance with an embodiment of the present disclosure.

FIG. 4 is a block diagram 400 that illustrates an executable node 402 within the executable graph-based model 100, in accordance with an embodiment of the present disclosure. Referring to FIG. 4, the executable node 402 is shown to include a base node, e.g., the node 302 (hereinafter referred to as the "base node 302") and an overlay manager 404. The overlay manager 404 includes a first overlay node 406 and a second overlay node 408. The executable node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable node 402).

As shown, the first overlay node 406 has a first overlay node type 410 and the second overlay node 408 has a second overlay node type 412. Examples of overlay node type includes, but are not limited to, a handler overlay node, a publisher overlay node, an analytics overlay node, or the like.

A handler overlay node is a node that includes processing logic for subscribing to one or more messages mapped to the corresponding executable node and processing the subscribed messages in conjunction with the corresponding base node. The handler overlay node, being a node, adheres to the generic structure of a node described in conjunction with FIG. 3. The term 'subscribe' refers to an operation that is executed by a handler overlay node for receiving a message from another executable node or the message management module 214 of the overlay system 202.

A publisher overlay node is a node that includes processing logic for the generation and publication of one or more messages to be communicated by the corresponding executable node. The publisher overlay node may be an extension of a base node or an overlay node (e.g., a handler overlay node). The publisher overlay node, being a node, adheres to the generic structure of a node described in conjunction with FIG. 3. In an instance, when the publisher overlay node is an extension of a base node, the publisher overlay node may generate and publish messages that are to be communicated by the corresponding base node. In another instance, when the publisher overlay node is an extension of another overlay node (e.g., an analytics overlay node), it may generate and publish analytics outcomes (e.g., the outcome 234) based on execution of a set of analytics operations by an analytics overlay node.

An analytics overlay node is a node that includes processing logic for analysis of messages being communicated within the overlay system 202. The analytics overlay node may be associated with one or more message nodes that are instantiated to represent messages associated with the overlay system 202. The analytics overlay node, being a node, adheres to the generic structure of a node described in conjunction with FIG. 3. The analytics overlay node may be one of a descriptive analytics overlay node, a diagnostic overlay node, a predictive analytics overlay node, and a prescriptive analytics overlay node. Each of the first and second overlay nodes types 410 and 412 may correspond to a descriptive analytics overlay node type, a diagnostic analytics overlay node type, a predictive analytics overlay node type, a prescriptive analytics overlay node type, or the like. The descriptive analytics overlay node includes processing logic that when executed is configured to process composition of a message node that is associated therewith to determine the one or more analytic insights associated with communication of a set of messages represented by the set of associated message nodes. The diagnostic analytics overlay node includes processing logic that when executed is configured to process composition of a message node that is associated therewith to identify one or more patterns that are indicative of a current performance of the business solution associated with the overlay system 202. The predictive analytics overlay node includes processing logic that when executed is configured to process composition (transaction information and data) of a message node that is associated therewith to determine one or more predictions regarding the performance of the business solution associated with the overlay system 202 during a predefined time interval. The prescriptive analytics overlay node includes processing logic that when executed is configured to analyze composition of a message node that is associated therewith to generate one or more recommendations to achieve a desired performance of the business solution associated with the overlay system 202. Notably, each analytics overlay node has a set of associated message nodes, where the analytics overlay node is configured to execute corresponding set of analytic operations on a corresponding set of associated message nodes. The term 'associated message nodes' refer to one or more message nodes that are associated with a corresponding analytics overlay node.

Although, the executable node 402 is shown to include the first and second overlay nodes 406 and 408, in other embodiments, the executable node 402 may include any number of overlay nodes, without deviating from the scope of the present disclosure.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a combination of the base node 302 and the first and second overlay nodes 406 and 408. The executable node 402 may be alternatively referred to as a node with overlay(s). Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a type such as a vertex node type, an edge node type, a message node type, a message edge node type, or the like. Alternatively, the base node 302 may itself be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that functionalities of the first and second overlay nodes 406 and 408 may be performed by a single overlay node that includes processing logic for performing descriptive analytics, diagnostic analytics, prescriptive analytics, predictive analytics, or any other operation associated with performing message management using the executable graph-based model 100.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node type of the node to which the overlay node is applied.

An overlay node, such as the first overlay node 406 or the second overlay node 408, is not bound to a single executable node or a single executable graph-based model (unlike nodes that have non-overlay node types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

The data and the processing logic associated with one or more overlays of an executable node (for example, the executable node 402) are persistent. The persistent nature of the data and the processing logic are described in detail in conjunction with FIG. 5.

Figure 5:
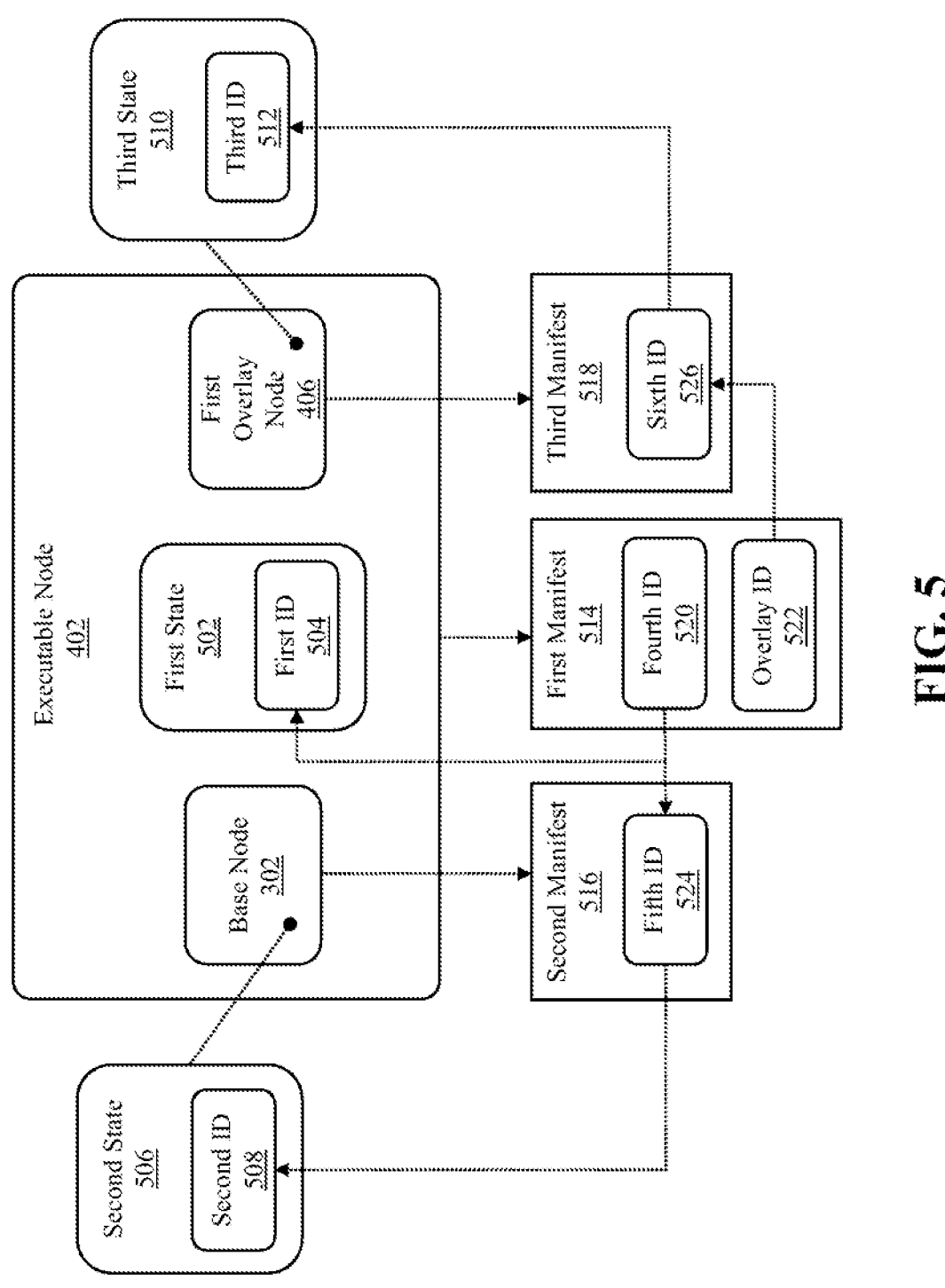
FIG. 5 is a block diagram that illustrates a composition of the executable node that enables persistent storage of data and processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the base node 302 and one or more overlay nodes (e.g., the first and second overlay nodes 406 and 408). For the brevity of ongoing discussion, the persistent storage is explained for the executable node 402 including only the first overlay node 406. One or more operations performed for ensuring the persistence of the first overlay node 406 may be performed for the second overlay node 408 as well.

Referring to FIG. 5, the executable node 402 includes the base node 302 and the first overlay node 406. The executable node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable node 402, and the first overlay node 406. In an embodiment, the manifests may be generated by the storage management module 220. The first manifest 514 is associated with the executable node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the first overlay node 406. Therefore, the first manifest 514 may be used to identify and retrieve the states of the base node 302, the executable node 402, and the first overlay node 406. Subsequently, the retrieved states may be used to reconstruct the executable node 402 and the first overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has (i) the fifth ID 524 and (ii) the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibits a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node 302 is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

In some embodiments, the first overlay node 406 may not be loaded in case it is not required for executing the operation associated with the stimulus 230. The loaded executable node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 220. Such centralized storage of the manifest states ensures that node states associated therewith are easily accessible.

It will be apparent to a person skilled in the art that although FIG. 5 illustrates only a single overlay node, in other embodiments, the executable node may include additional or different overlay nodes (for example, the second overlay node 408). It will also be apparent to a person skilled in the art that only those overlay nodes that are required for responding to the stimulus 230 may be loaded.

The overlay system 202 described above may be used to implement systems and methods for performing management of messages by performing analytics thereof using the executable graph-based models (for example, the executable graph-based model 100). In an example, the executable graph-based model 100 may be implemented for a business solution (for example, a task assignment system, a production pipeline, or the like). In such implementations, the executable graph-based model 100 may include a node for each module of the business solution. The executable graph-based model 100 may be used for facilitating communication among modules of the business solution. In such an example, messages being communicated among the modules may be analyzed to determine one or more analytic insights associated with performance of the business solution. Such analytic insights may be used for optimizing performance of the business solution.

Figure 6:
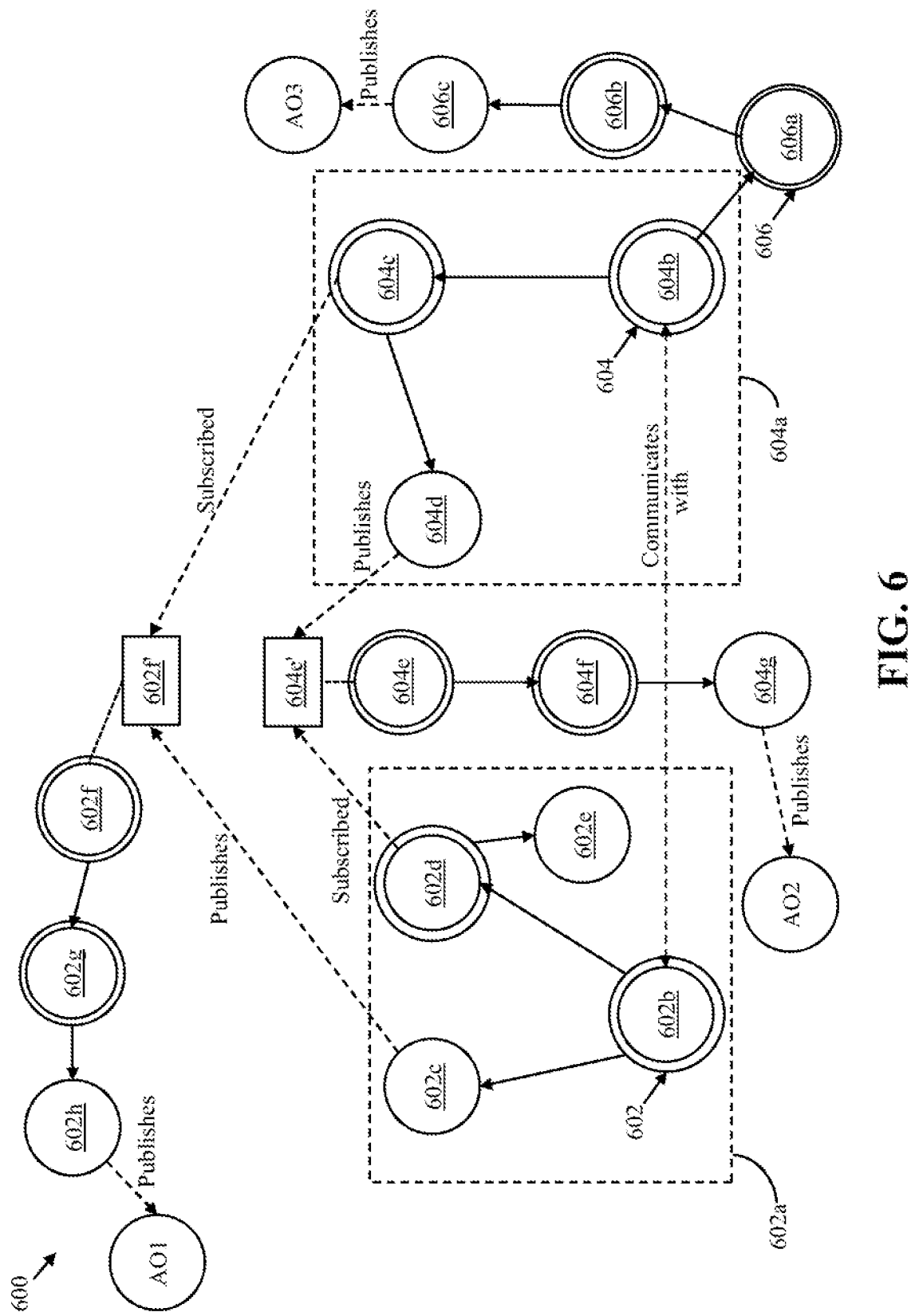
FIG. 6 is a graph that illustrates an implementation of the executable graph-based model 100, in accordance with an embodiment of the present disclosure.

FIG. 6 is a graph 600 that illustrates an implementation of the executable graph-based model 100, in accordance with an embodiment of the present disclosure. Referring to FIG. 6, the executable graph-based model 100 is shown to include a plurality of executable nodes (e.g., a first executable node 602 and a second executable node 604). Each executable node includes a base node and a set of overlay nodes (for example, analytics overlay nodes, handler overlay nodes and/or publisher overlay nodes). In an embodiment, the base node of each executable node corresponds to a message node, a message edge node, a hyper-edge node, or a vertex node. However, in other embodiments, the base node may correspond to any other node type, without deviating from the scope of the present disclosure.

As shown in FIG. 6, the first executable node 602 logically includes the base node and overlay nodes shown within a dotted box 602a. That is to say that the first executable node 602 logically includes a base node 602b, a publisher overlay node 602c, a handler overlay node 602d, and another publisher overlay node 602e. The publisher overlay node 602c and the handler overlay node 602d correspond to overlays of the base node 602b. The publisher overlay node 602e is an overlay of the handler overlay node 602d. Similarly, the second executable node 604 logically includes a base node and overlay nodes shown within another dotted box 604a. The second executable node 604 logically includes a base node 604b and a handler overlay node 604c that is extended by a publisher overlay node 604d. The handler overlay node 604c corresponds to an overlay of the base node 604b, whereas, the publisher overlay node 604d corresponds to an overlay of the handler overlay node 604c. The base nodes 602b and 604b are communicatively coupled and communicate with each other by way of corresponding overlay nodes.

As shown in FIG. 6, the first and second executable nodes 602 and 604 are represented in the executable graph-based model 100 by way of two concentric circles, with the inner circles representing the base nodes 602b and 604b, and outer circles indicating the presence of overlays for extending the functionalities of the base nodes 602b and 604b, respectively. In such a scenario, the association between the base nodes 602b and 604b is represented by an arrow linking the two inner circles. Similarly, some overlay nodes (e.g., the publisher overlay node 602c) are represented in the executable graph-based model 100 by way of single circles as they are not extended using overlays. In such a scenario, the association of the first executable node 602 with the publisher overlay node 602*c* is represented by an arrow linking the outer circle of the first executable node 602 to the publisher overlay node 602*c*. On the other hand, the handler overlay nodes 604*c* and 602*d* are represented in the executable graph-based model 100 by way of two concentric circles, with the inner circle representing the corresponding overlay node and the outer circle indicating the presence of overlays. In such a scenario, the association between the second executable node 604 and the handler overlay node 604*c* is represented by an arrow linking the outer circle of the second executable node 604 to the inner circle of the handler overlay node 604*c*. Further, the publisher overlay node 604*d* is represented in the executable graph-based model 100 by way of a single circle, and the association between the handler overlay node 604*c* and the publisher overlay node 604*d* is represented by an arrow linking the outer circle of the handler overlay node 604*c* to the publisher overlay node 604*d*. Similarly, the association between the first executable node 602 and the handler overlay node 602*d* is represented by an arrow linking the outer circle of the first executable node 602 to the inner circle of the handler overlay node 602*d*. Further, the publisher overlay node 602*e* is represented in the executable graph-based model 100 by way of a single circle, and the association between the handler overlay node 602*d* and the publisher overlay node 602*e* is represented by an arrow linking the outer circle of the handler overlay node 602*d* to the publisher overlay node 602*e*.

The controller module 206 may receive a first contextualized stimulus. The contextualized stimulus may include a first stimulus and a context associated therewith. The stimulus may correspond to a command-type message, a query-type message, or an event-type message. The context module 210 may process the context and generate an operational context that is indicative of one or more message nodes, one or more message edge nodes, one or more overlay nodes, or the like, that are to be loaded for stimulus processing of the first stimulus. The stimuli management module 212 may execute stimulus processing of the first stimulus. The stimuli management module 212 may communicate with the message management module 214, the memory management module 218, and the storage management module 220 to load, based on the operational context, the one or more message edge nodes, the one or more analytic overlay nodes, the one or more publisher overlay nodes, or the like, that are to be loaded for the stimulus processing of the first stimulus. Such loading is performed as described in conjunction with FIG. 5.

Based on the first stimulus, the first executable node 602 communicates a first message 602*f'* (represented by a rectangular box in FIG. 6) to the second executable node 604. The first message 602*f'* is generated and published by way of the publisher overlay node 602*c* of the first executable node 602. A first message node 602*f* is instantiated for the first message 602*f'*. The message management module 214 is configured to instantiate the first message node 602*f* for the first message. The second executable node 604 receives the first message 602*f'* via the handler overlay node 604*c*. The publisher overlay node 604*d*, of the handler overlay node 604*c*, generates and publishes a second message 604*e'* (represented by a rectangular box in FIG. 6) in response to the processing of the first message 602*f'* by the handler overlay node 604*c*. A second message node 604*e* is instantiated for the second message 604*e'*. The message management module 214 is configured to instantiate the second message node 604*e* for the second message 604*e'*. For the sake of simplicity, compositions of the first and second message nodes 602*f* and 604*e* are not shown in FIG. 6. The first and second message nodes 602*f* and 604*e* are shown by way of two concentric circles. Therefore, the first and second message nodes 602*f* and 604*e* are associated with one or more overlay nodes (for example, an analytics overlay node, an encryption overlay node, or the like).

The message management module 214 may be configured to instantiate one or more analytics overlay nodes for each of the first and second message nodes 602*f* and 604*e*. As shown, the message management module 214 may instantiate the first analytics overlay node 602*g* for the first message node 602*f* and the second analytics overlay node 604*f* for the second message node 604*e*. The first analytics overlay node 602*g* may include processing logic to perform a corresponding set of analytics operations on the composition of the first message node 602*f*. The second analytics overlay node 604*f* may include processing logic to perform a corresponding set of analytics operations on the composition of the second message node 604*e*. Further, the message management module 214 may be configured to instantiate a publisher overlay node for each analytics overlay node (for example, the first analytics overlay node 602*g*, the second analytics overlay node 604*f*, or the like).

In operation, the controller module 206 may receive a second contextualized stimulus. The second contextualized stimulus may include a second stimulus (for example, the stimulus 230) and a context 226 associated therewith. The context module 210 may process the context and generate operational context that is indicative of one or more message nodes, one or more message edge nodes, one or more analytic overlay nodes, one or more publisher overlay nodes, or the like, that are to be loaded for stimulus processing of the stimulus 230. The stimulus 230 may be indicative of an instruction to analyze the first and second messages 602*f'* and 604*e'*. The stimulus 230 may be further indicative of a type of analytics to be performed on the first and second messages 602*f'* and 604*e'*. Based on the operational context, the stimuli management module 212 may be configured to identify the first and second message nodes 602*f* and 604*e* that represent the first and second messages 602*f'* and 604*e'*, respectively. Subsequently, based on the type of analytics to be performed, the stimuli management module 212 may be further configured to identify one or more analytics overlay nodes that may be associated with the first and second message node 602*f* and 604*e*. As shown, the first message node 602*f* is extended to have the first analytics overlay node 602*g* and the second message node 604*e* is extended to have the second analytics overlay node 604*f*. Based on the type of analytics to be performed, the stimuli management module 212 may identify the first analytics overlay node 602*g* and the second analytics overlay node 604*f*. The first and second analytics overlay nodes 602*g* and 604*f* may be any one of the the descriptive analytics overlay node, the diagnostic overlay node, the predictive analytics overlay node, and the prescriptive analytics overlay node.

The analytics module 240 may be configured to execute the operation associated with the stimulus 230 using (i) the first and second message nodes 602*f* and 604*e* and (ii) the first and second analytics overlay nodes 602*g* and 604*f*. The analytics module 240 may be further configured to execute the operation associated with the stimulus 230 based on publisher overlay nodes 602*h* and 604*g* associated with the first and second analytics overlay nodes 602*g* and 604*f*, respectively. The execution of the operation associated with the stimulus 230 corresponds to the generation and publication of an analytics outcome (for example, analytics outcomes AO1 and AO2) based on one or more analytic insights generated by one or more analytics overlay nodes associated with the message nodes being analyzed.

The first analytics overlay node 602g executes a corresponding set of analytics operations on the composition of the first message node 602f and determines one or more analytic insights based on the execution. Subsequently, the publisher overlay node 602h that extends the first analytics overlay node 602g generates and publishes the analytics outcome AO1 based on the one or more analytic insights. The analytics outcome AO1 may be indicative of an evaluation of one or more tasks associated with the business solution that is executed by the first executable node 602 and one or more other modules of the business solution by communicating and processing the first message 602f. Similarly, the second analytics overlay node 604f executes a corresponding set of analytics operations on the composition of the second message node 604e. Subsequently, the publisher overlay node 604g that extends the second analytics overlay node 604f generates and publishes the analytics outcome AO2 based on an output of the execution of the set of analytics operations by the second analytics overlay node 604f. The analytics outcome AO2 may be indicative of an evaluation of one or more tasks associated with the business solution that is executed by the second executable node 604 and one or more modules of the business solution by communicating and processing the second message 604e'.

In some embodiments, the first and second message nodes 602f and 604e may include confidential data (for example, PHI data or PII data). Hence, the analytics outcome associated therewith also requires to be protected. In such embodiments, the first and second analytics overlay nodes 602g and 604f and/or the publisher overlay nodes 602h and 604g may also be extended to include an encryption overlay node or an obfuscation overlay node that may include processing logic that when executed protects the confidential data stored at the first and second message nodes 602f and 604e. In other embodiments, the first and second message nodes 602f and 604e may be extended to include other types of overlay nodes, without deviating from the scope of the disclosure.

In an embodiment, the stimulus management module 212 may identify the first message node 602f for stimulus processing of the stimulus 230. In such an embodiment, the first message may be associated with a set of messages. That is to say that, the first message node 602f may be associated with a set of message nodes that represent the set of messages. In an example, the set of messages may include the second message, hence, the set of message nodes may include the second message node 604e. The first message 602f' and the set of messages may be correlated such that the first message 602f' may have a causal association with at least one other message (for example, the second message 604e') of the set of messages. Further, the set of messages is correlated such that each message of the set of messages has a causal association with at least one other message of the set of messages. The set of messages is generated based on one or more stimuli (for example, the first stimulus) received prior to the stimulus 230. The message management module 214 may have instantiated a set of message nodes based on the generation of the set of messages upon reception of the first stimulus. The analytics module 240 may be configured to execute the operation associated with the stimulus 230 based on the first message 602f' and the set of correlated messages.

For performing the operation associated with the stimulus 230, the message management module 214 is further configured to identify the set of message nodes associated with the set of messages and at least one analytics overlay node associated with each message node of the set of message nodes. The analytics module 240 executes the operation associated with the stimulus 230 further based on the identified set of message nodes and the identified analytics overlay node associated with each message node of the set of message nodes. Notably, the first message node 602f and the set of message nodes are linked (e.g., correlated) by way of one or more correlation identifiers, one or more message edge nodes, or the like.

As shown in FIG. 6, the executable graph-based model 100 further includes a plurality of non-message nodes that include vertex nodes, edge nodes, and generic overlay nodes, where generic overlay nodes are overlay nodes that are different from the analytics overlay nodes. One or more of the plurality of non-message nodes are associated with one or more analytics overlay nodes.

As shown, the second executable node 604 is further associated with a third executable node 606 (a non-message node) that has a base node 606a. The third executable node 606 may be one of a vertex node, an edge node, a role node, and an overlay node. For the sake of ongoing description, the third executable node 606 is assumed to be a vertex node that stores metadata associated with the second executable node 604. The third executable node 606 is extended to include a third analytics overlay node 606b that is configured to execute a corresponding set of analytics operations on the metadata stored at the third executable node 606.

In some embodiments, the context 226 of the stimulus 230 may be indicative of analysis of a non-message node to be performed. Specifically, the stimulus 230 may be indicative of an analysis of the metadata associated with second executable node 604. In such embodiments, the message management module 214 may be configured to identify the third executable node 606, that is a non-message node of the executable graph-based model 100 and stores the metadata associated with the third executable node 606. The message management module 214 is further configured to identify, based on the context 226 of the stimulus 230, the third analytics overlay node 606b of the third executable node 606. The message management module 214 is further configured to identify a publisher overlay node (for example, a publisher overlay node 606c) of the third analytics overlay node 606b. The analytics module 240 may be configured to use the third analytics overlay node 606b and the publisher overlay node 606c to execute the operation associated with the stimulus 230. The third analytics overlay node 606b may execute corresponding set of analytics operations on the metadata stored at the third executable node 606 and may generate one or more analytic insights indicative of performance of an evaluation of one or more tasks associated with the business solution that is executed by the second executable node 604 and one or more modules communicating directly or indirectly with the second executable node 604. Subsequently, the publisher overlay node 606c associated with the third analytics overlay node 606b may generate and publish an analytics outcome AO3 based on a functionality of the third analytics overlay node 606b. That is to say that, the publisher overlay node 606c may generate the analytics outcome AO3 based on the one or more analytic insights generated by the third analytics overlay node 606b.

In the present disclosure, data and processing logic are stored separately to ensure segregation and independent control thereof. Therefore, prior to the execution of the operation associated with the stimulus 230, the message management module 214 may be configured to determine all nodes that are required for executing the operation associated with the stimulus 230 and load, in the executable graph-based model 100, nodes, that are currently not loaded, with corresponding data and processing logic. For example, in case only the first and second message nodes 602f and 604e are not loaded, the storage management module 220 may be configured to load, in the executable graph-based model 100, the compositions of the first and second message nodes 602f and 604e. In case only the first and second analytics overlay nodes 602g and 604f are not loaded, the storage management module 220 may be configured to load such nodes in the executable graph-based model 100 with corresponding data and processing logic. In case, in the executable graph-based model 100, only the publisher overlay nodes 602h and 604g are not loaded, the storage management module 220 may be configured to load such nodes with corresponding data and processing logic. Multiple combinations may be possible without deviating from the scope of the present disclosure. The loading of the message nodes, analytics overlay nodes, publisher overlay nodes, or a combination thereof, is performed as described above in FIG. 5.

Although the first and second message nodes 602f and 604e are shown to have the first and second analytics overlay nodes 602g and 604f, in other embodiments, the first and second message nodes 602f and 604e may have additional or different overlay nodes.

It will be apparent to a person skilled in the art that message nodes (for example, message nodes 602f and 604e) are created for corresponding messages (not shown) that are generated and processed in the executable graph-based model 100.

Although FIG. 6 describes two message nodes, the scope of the present disclosure is not limited to it. In various other embodiments, various message nodes may be analyzed, and the analytics may be performed separately for each message or collectively for a set of correlated messages. The set of correlated messages include messages that have an association (for example, a causal association) therebetween.

It will be appreciated by a person skilled in the art that although FIG. 6 illustrates the executable nodes to be extended only by way of analytics overlay nodes, handler overlay nodes and publisher overlay nodes, in other embodiments, the executable nodes may further include other overlay nodes such as an encryption overlay node, an obfuscation overlay node, or the like. Throughout the description the terms 'overlay' and 'overlay node' are used interchangeably.

It will be apparent to a person skilled in the art that the structure of the executable graph-based model 100 is non-limiting. The structure of the executable graph-based model 100 is dynamic and may be modified based on an input (e.g., internal/external) received by the overlay system 202.

Further, the executable graph-based model 100 has a tier-based architecture (shown later in FIG. 7). The nodes (for example, the first and second message nodes 602f and 604e, the first and second analytics overlay nodes 602g and 604f, the publisher overlay nodes 602h and 604g, or the like) shown in FIG. 6 may belong to different tiers of the executable graph-based model 100. Each tier of the plurality of tiers encompasses a set of nodes. For example, a first tier of the plurality of tiers includes messages associated with the overlay system 202, a second tier of the plurality of tiers include message nodes instantiated for the messages associated with the overlay system 202, a third tier of the plurality of tiers may include analytics overlay nodes associated with the message nodes, and a fourth tier of the plurality of tiers include publisher overlay nodes associated with the analytics overlay nodes.

Figure 7:
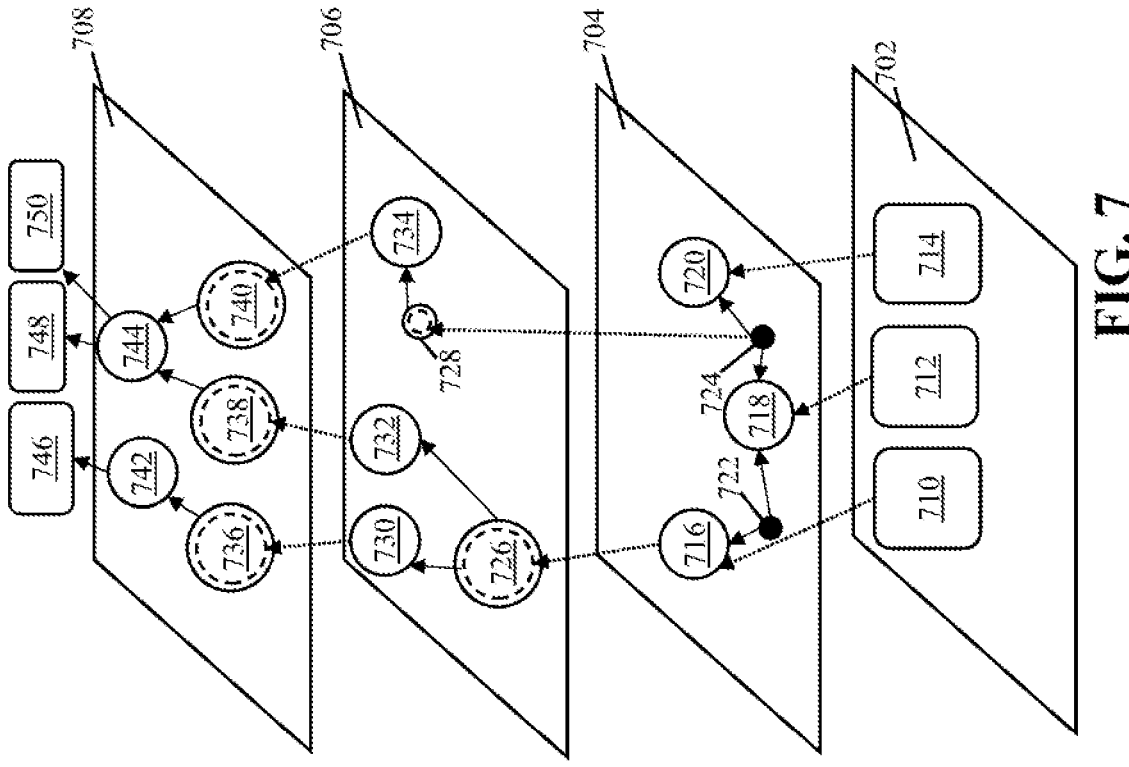
FIG. 7 is a schematic diagram that illustrates the tier-based architecture of the executable graph-based model, in accordance with an embodiment of the present disclosure.
Figure 7:

FIG. 7 is a schematic diagram that illustrates the tier-based architecture 700 of the executable graph-based model 100, in accordance with an embodiment of the present disclosure. Referring to FIG. 7, a first tier of the executable graph-based model 100 is a message-tier 702 and includes messages associated with the overlay system 202. A second tier of the executable graph-based model 100 is a graph-tier 704 and includes message nodes instantiated for the messages at the message-tier 702. The graph-tier 704 may also include one or more non-message nodes of the executable graph-based model 100. A third tier of the executable graph-based model 100 is an analytics-tier 706 and include one or more analytics overlay nodes associated with the message-nodes at the graph-tier 704. A fourth tier of the executable graph-based model 100 is an analytics outcome tier 708 that includes one or more publisher overlay nodes associated with the analytics overlay nodes at the analytics-tier 706. The message-tier 702, the graph-tier 704, the analytics-tier 706, and the analytics outcome tier 708, collectively, form the executable graph-based model 100.

In operation, the messages associated with the overlay system 202 are created at the message-tier 702. As shown, the message-tier 702 includes messages 710-714. Each of the messages 710-714 may be one of a command message, a query message, and an event message. Further, for the messages 710-714, message nodes 716-720, respectively, are instantiated at the graph-tier 704. In some embodiments, the messages 710-714 may be correlated by way of a causal association and such correlation may be reflected in the message nodes 716-720 by coupling thereof via message edge nodes 722 and 724. As shown, the message edge 722 couples the message nodes 716 and 718, whereas, the message edge node 724 couples the message nodes 718 and 720. Further, based on the stimulus 230, analysis of the messages 710-714 may have to be performed. Therefore, one or more message nodes (for example, the message node 716) for which analysis is to be performed is identified. Subsequently, a message node reference 726 (represented by way of a dashed circle) of the message node 716 is created at the graph-tier 704. The message node reference 726 is a pointer to the message node 716. The message node reference 726 is represented by way of two concentric circles where an outer circle is formed by a solid line and an inner circle is formed by a dashed line. The message edge node 724 is able to access each of the message nodes 718 and 720. Hence, a message edge node reference 728 (represented by way of a dashed circle) of the message edge node 724 is created at the analytics-tier 706. It will be apparent to a person skilled in the art that, for each executable node that is to be analyzed, a corresponding node reference is created at the analytics-tier 706. A node reference is a pointer to another node that is being referred. The node reference is immutable and may not be modified without modifying the node that is being referred. It will be apparent to a person skilled in the art that each node reference that is encompassed within another circle is indicative of the corresponding node having an overlay associated therewith.

At the analytics-tier, the message node reference 726 is associated with analytics overlay nodes 730 and 732, where each of the analytics overlay nodes 730 and 732 have distinct overlay node types. Hence, the analytics overlay nodes 730 and 732 may perform corresponding set of analytic operations on a composition of the message node 716. Similarly, the message edge node reference 728 is associated with an analytics overlay node 734 that may have similar or different overlay node type from the analytics overlay nodes 730 and 732. The analytics overlay node 734 may perform corresponding set of analytic operations on compositions of the message nodes 718 and 720.

At the analytics outcome tier 708, analytics overlay node references 736, 738, and 740 (shown by way of corresponding dashed circles) are created for the analytics overlay nodes 730, 732, and 734, respectively. As shown, at the analytics outcome tier 708, the analytics overlay node reference 736 is associated with a publisher overlay node 742 and the analytics overlay node references 738 and 740 are associated with a publisher overlay node 744. The publisher overlay node 742 may generate, based on the message 710, an analytics outcome 746 that includes analytic insights associated with the performance of the business solution associated with the overlay system 202. Similarly, the publisher overlay node 744 may also generate, based on the message 712, an analytics outcome 748 that may include analytic insights associated with the performance of the overlay system 202. The analytics outcomes 746 and 748 may have different analytic insights associated with the performance of the business solution. In an example, the analytics outcome 746 may be indicative of one or more analytic insights associated with predictive analysis of the message 710, whereas, the analytics outcome 748 may be indicative of one or more analytic insights associated with predictive analysis, performed on the composition of the message 712.

The publisher overlay node 744 may also generate an analytics outcome 750 that includes analytic insights that is generated based on the message nodes 718 and 720 and is indicative of the performance of the business solution associated with the overlay system 202. To summarize, the abovementioned operations are executed for performing the stimulus processing of the stimulus 230. Hence, the stimulus processing of the stimulus 230 includes each of the operations performed at the message-tier 702, the graph-tier 704, the analytics-tier 706, and the analytics outcome tier 708.

As mentioned earlier, the analytics outcomes 746-750 are results of analysis performed on the compositions of the message nodes 716, 718, and 720. The compositions of the message nodes 716, 718, and 720 are indicative of data and transactional information associated with the messages 710-714.

It will be apparent to a person skilled in the art that, in other embodiments, the executable graph-based model 100 may include different or additional layers in its architecture without deviating from the scope of the disclosure. Such layers may include a plurality of non-message nodes (for example, vertex nodes, edge nodes, and overlay nodes). One or more non-message nodes of the plurality of non-message nodes may be associated with the message nodes at the graph-tier 704. The one or more non-message nodes may have participated in generation, publication, handling, processing, or any other process associated with messages at the message-tier 702 that are represented by the corresponding message nodes at the graph-tier 704. Also, the analytics overlay nodes at the analytics-tier 706 and the publisher overlay nodes at the analytics outcome tier 708 may directly or indirectly communicate with the one or more non-message nodes at different layers of the executable graph-based model 100 in order to acquire data required for generation of the analytics outcome. Additionally, the analytics overlay nodes at the analytic tier-706 and the publisher overlay nodes at the analytics outcome tier 708 may be coupled with or inherit from the non-message nodes (for example, vertex nodes, edge nodes, and overlay nodes) in order to acquire data and/or processing logic required for generation of the analytics insight or the analytics outcome.

Figure 8:
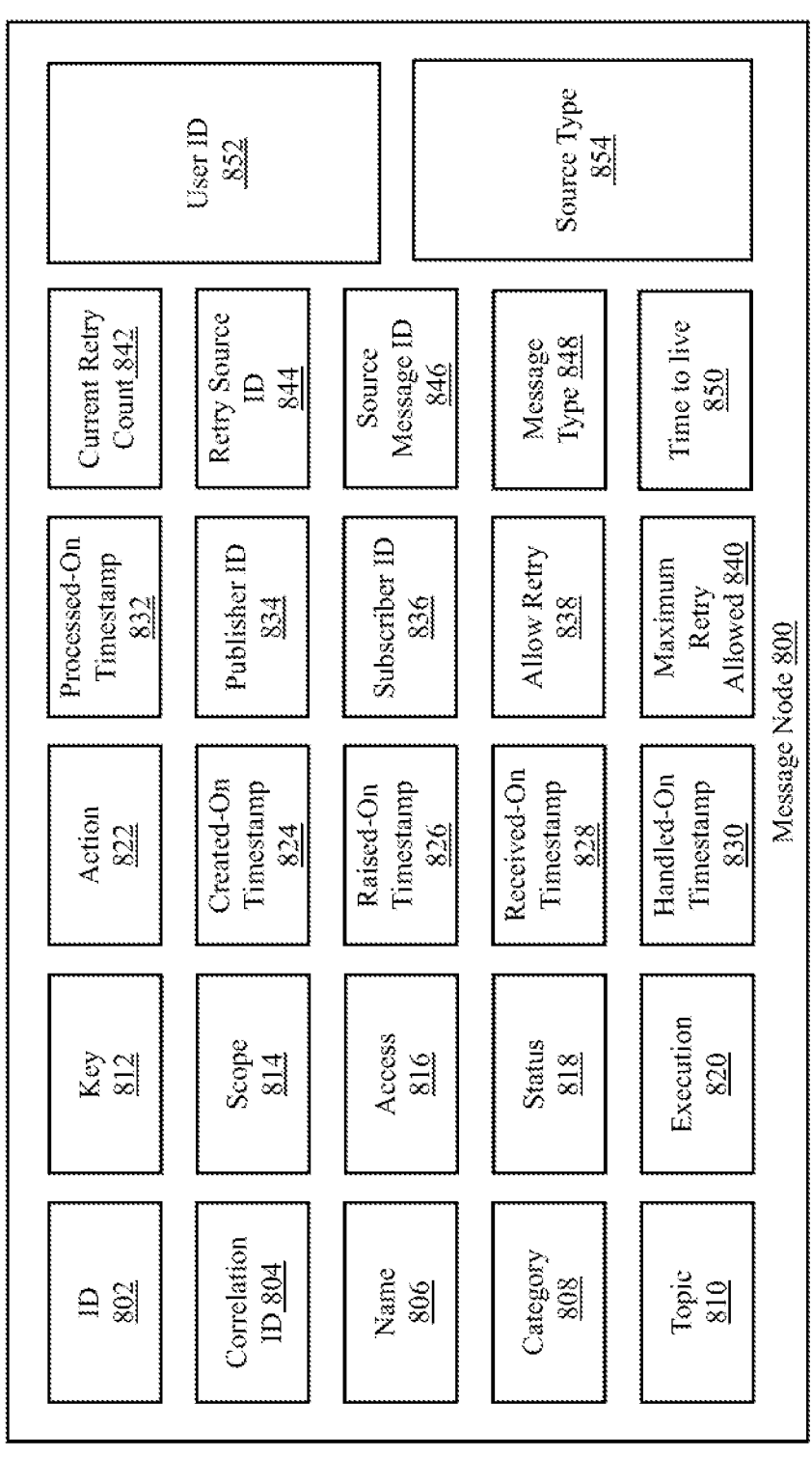
FIG. 8 is a block diagram that illustrates a composition of a message node, in accordance with an embodiment of the present disclosure.

FIG. 8 is a block diagram that illustrates composition of a message node 800, in accordance with an embodiment of the present disclosure. The message node 800 may represent one of a command-type message, a query-type message, and an event-type message. The message node 800 may be one of the message nodes 716-720 or any other message node associated with the overlay system 202. The message includes data and transactional information that may be used for communication, processing, and auditing associated with the overlay system 202. Data included in composition of a message node refers to message payload associated with a message being represented by the message node. In other words, the data in the composition of the message node refers to a statement, an instruction, a message, a command, a query, or the like that is being communicated via the message.

Referring to FIG. 8, the composition of the message node 800 includes a plurality of attributes that form the transactional information associated with the message node 800. The plurality of attributes include attributes 'ID' 802, 'Correlation ID' 804, 'Name' 806, 'Category' 808, 'Topic' 810, 'Key' 812, 'Scope' 814, 'Access' 816, 'Status' 818, 'Execution' 820, 'Action' 822, 'Created-On Timestamp' 824, 'Raised-On Timestamp' 826, 'Received-On Timestamp' 828, 'Handled-On Timestamp' 830, 'Processed-On Timestamp' 832, 'Publisher ID' 834, 'Subscriber ID' 836, 'Allow Retry' 838, 'Maximum Retry Allowed' 840, 'Current Retry Count' 842, 'Retry Source ID' 844, 'Source Message ID' 846, 'Message Type' 848, 'Time to live' 850, 'User ID' 852, and 'Source Type' 854. Though the data associated with the message node 800 is not shown in FIG. 8, it will be apparent to a person skilled in the art that the composition of the message node 800 includes the data to be communicated by the message that is being represented by the message node 800.

The attribute 'ID' 802 included in the message node 800 is a unique ID associated the message represented by the message node 800 and may be used by modules (for example, the message management module 214) of the overlay system 202 to identify the message node 800.

The attribute 'Correlation ID' 804 included in the message node 800 is an ID that is shared among messages that are related. The attribute 'Correlation ID' 804 is used to join and correlate one or more messages in a transaction flow such as a command to event, a query to event, or the like. Each sub-message (child message) of a compound message (parent message) includes a hierarchical correlation ID. Further, sub-messages at the same level of hierarchy have identical attribute value for the attribute 'Correlation ID' 804. Sub-messages at each subsequent hierarchical level further include attribute values of the attribute 'Correlation ID' 804 of sub-messages at previous hierarchical levels. Each sub-message also includes a root identifier (ID) that is associated with the parent message. Correlation among messages is described in detail in conjunction with FIG. 9.

The attribute 'Name' 806 included in the message node 800 is a human-understandable descriptor of the message and is solely included for the ease of understanding of users associated with the overlay system 202.

The attribute 'Category' 808 included in the message node 800 is a human-understandable descriptor of a domain or criterion of the message. For example, an attribute value of the attribute 'Category' 808 of the message node 800 may be a hand movement message.

The attribute 'Topic' 810 included in the message node 800 is a human-understandable descriptor of a topic/domain/subject/agenda associated with which the message node 800 has been published. Notably, the attribute 'Topic' 810 allows grouping of multiple messages irrespective of their category. Each message may be associated with a single attribute value of the attribute 'Topic' 810, whereas, each attribute value of the attribute 'Topic' 810 may be associated with multiple messages. Each attribute value of the attribute 'Topic' 810 may have one or more subscribers. Each attribute value of the attribute 'Topic' 810 may be published/scheduled for processing using a specific pipeline of a messaging bus (shown in FIG. 13) and then subscribed to by one or more handler overlay nodes.

The attribute 'Key' 812 included in the message node 800 corresponds to a target object unique ID that is an ID of a destination executable node of the message node 800. Messages having the same attribute value of the attribute 'Key' 812 have the same target object unique identifier. The attribute 'Key' 812 allows messages with the same attribute values of the attributes 'Topic' 810 and 'Key' 812 to be queued, so they are processed in order by the target object (destination executable node).

The attribute 'Scope' 814 included in the message node 800 ensures appropriate security of the message node 800. Attribute values of the attribute 'Scope' 814 may be internal or external. When the attribute value of the attribute 'Scope' 814 is internal, the message represented by the message node 800 may be internal, e.g., the message node 800 is to be communicated among executable nodes of the executable graph-based model 100. Alternatively, when the attribute value of the attribute 'Scope' 814 is external, the message represented by the message node 800 may be external, e.g., the message is to be communicated from one or more executable nodes of the executable graph-based model 100 to one or more modules that are external to the overlay system 202. Therefore, the attribute value of the attribute 'Scope' 814 in the composition of the message node 800 may be one of 'internal', 'external', and 'internal and external'.

The attribute 'Access' 816 included in the message node 800 determines access permission to the message node 800. In an instance, when an attribute value of the attribute 'Access' 816 is public, a user trying to access the message node 800 is not required to be authenticated prior to accessing the message node 800. In another instance, when the attribute value of the attribute 'Access' 816 is private, a user trying to access the message node 800 is required to be authenticated prior to accessing the message node 800.

The attribute 'Status' 818 included in the message node 800 is indicative of the progress of execution of the message node 800. An attribute value of the attribute 'Status' 818 of the message node 800 may be one of created, raised, received, handled, and processed.

The attribute 'Execution' 820 included in the message node 800 is indicative of a path that is to be traveled by the message node 800 to reach its destination executable node. The attribute 'Execution' 820 may have an attribute value 'synchronous' or 'asynchronous'. In an instance, when the attribute value of the attribute 'Execution' 820 may be 'asynchronous', the message node 800 may follow a hierarchical path associated with the hierarchical structure of the executable graph-based model 100. In another instance, when the attribute value of the attribute 'Execution' 820 may be 'synchronous', the message node 800 may be communicated directly from a source executable node (an executable node that has received the stimulus 230) to the destination executable node. Synchronous communication requires less time for communication of the message represented by the message node 800 and can be used when the message is only directed to the destination executable node and does not require any sequence in operation(s) to be performed based on the processing of the message.

The attribute 'Action' 822 included in the message node 800 is indicative of an action or operation to be performed by the target object. The terms 'target object' and 'destination executable node' are used interchangeably and may execute an operation indicated by the attribute 'Action' 822 in conjunction with the corresponding base node.

The attribute 'Created-On Timestamp' 824 included in the message node 800 includes details (such as time, date, day, month, or the like) regarding the creation of the message, represented by the message node 800, by its source executable node.

The attribute 'Raised-On Timestamp' 826 included in the message node 800 includes details (such as time, date, day, month, or the like) regarding publication of the message node 800 in a communication bus by its source executable node. The communication bus forms a channel between a source and a destination of the message represented by the message node 800.

The attribute 'Received-On Timestamp' 828 included in the message node 800 includes details (such as time, date, day, month, or the like) regarding when the message represented by the message node 800 is received by the destination executable node but has not been processed.

The attribute 'Handled-On Timestamp' 830 included in the message node 800 includes details (such as time, date, day, month, or the like) associated with a point in time when the processing of the message represented by the message node 800 is initiated.

The attribute 'Processed-On Timestamp' 832 included in the message node 800 includes details (such as time, date, day, month, or the like) regarding when the processing of the message represented by the message node 800 gets completed.

The attribute 'Publisher ID' 834 included in the message node 800 is a unique ID for a publisher overlay node that has published the message represented by the message node 800. An attribute value of the attribute 'Publisher ID' 834 may be associated with the source executable node or an intermediate executable node.

The attribute 'Subscriber ID' 836 included in the message node 800 is a unique ID for a handler overlay node(s) that subscribe to the message node 800. Notably, a command-type message and a query-type message may be subscribed by a single executable node whereas an event-type message may be subscribed by multiple executable nodes and each executable node receives a copy of the event-type message.

The attribute 'Allow Retry' 838 included in the message node 800 ensures successful communication and processing of the message represented by the message node 800. An attribute value of the attribute 'Allow Retry' 838 determines if the message represented by the message node 800 is to be re-published in case a status of the message node 800 is a failure or partial failure. The re-published message may be a clone of the original message represented by the message node 800.

The attribute 'Maximum Retry Allowed' 840 included in the message node 800 determines a maximum count for which the message represented by the message node 800 is to be re-published in case the status of the message is a failure or partial failure.

The attribute 'Current Retry Count' 842 included in the message node 800 keeps track of a number of times for which the message represented by the message node 800 is re-published. That is to say that, the attribute 'Current Retry Count' 842 is indicative of a current count of re-publications of the message represented by the message node 800. An attribute value of the attribute 'Current Retry Count' 842 gets incremented with each re-publication of the message represented by the message node 800.

The attribute 'Retry Source ID' 844 included in the message node 800 is a unique ID of an original message (e.g., the message represented by the message node 800) that is being re-published. The attribute 'Retry Source ID' is required as during the re-publication of the message represented by the message node 800, a clone message thereof with a different ID is generated and published. The clone message has timestamps (e.g., created-on timestamp, received-on timestamp, or the like) that are different from the timestamps included in the message node 800. Therefore, in order to link the clone message to the message represented by the message node 800, an attribute value of the attribute 'Retry Source ID' 844 is included in the clone message.

The attribute 'Source Message ID' 846 is included in the message node 800 if the message represented by the message node 800 has originated from another message. For example, an event-type message that is created in response to the processing of a command-type message may have an attribute value of the attribute 'Source Message ID' 846 that is identical to an attribute value 'ID' 802 of the command-type message.

The attribute 'Message Type' 848 is indicative of the message node 800 being one of a command message, a query message, or an event message. The message type 848 may further include a flag, where a value 1 of the flag may indicate that the message represented by the message node 800 is a leaf message whereas a value 0 of the flag may indicate that the message represented by the message node 800 is a composite message. The leaf message does not have any sub-messages, whereas, the composite message is a message having two or more sub-messages. In other embodiments, composite and leaf messages may be indicated differently without deviating from the scope of the disclosure.

The attribute 'Time to live' 850 may be indicative of a time period during which the message represented by the message node 800 may be valid. Therefore, the message should be communicated and processed within a duration that is indicated by an attribute value of the attribute 'Time to live' 850. In an instance of failure or partial failure, the message node 800 should not be re-published once the time period indicated by the attribute value of the attribute 'Time to live' 850 has lapsed. Notably, the lapse of the time period indicated by the attribute value of the attribute 'Time to live' 850 is indicative of the message represented by the message node 800 being invalid.

The attribute 'User ID' 852 has a corresponding attribute value that is a unique ID associated with a user of the overlay system 202 that may have generated the message represented by the message node 800.

The attribute 'Source Type' 854 refers to a type of message (e.g., command, query, and event) processing of which may have caused generation of the message represented by the message node 800. An attribute value of the attribute 'Source Type' 854 may be one of command, query, and event.

The composition of the message node 800 described in FIG. 8 may be used by the overlay system 202 for performing the analysis of the message represented thereby. Such analysis may be performed to determine one or more analytic insights associated with performance of the business solution associated with the overlay system 202.

In an example, the analytics module 240 may analyze the composition of the message node 800 by way of an analytics overlay node associated with the message node 800. The analytics overlay node may determine one or more correlated messages based the 'Correlation ID' 804 of the message node 800. Further, based on the status of the message node 800, the analytics overlay node may execute the set of analytics operations and may generate an analytic insight that is indicative of processing of the message node 800 partially failed, and hence, leading to incomplete execution of its correlated messages. Further, a publisher overlay node associated with the analytics overlay node may generate and publish a diagnostic analytics outcome that is indicative of one or more diagnostic steps to be taken in order to ensure a successful execution of the message represented by the message node 800 and its correlated messages.

It will be apparent to a person skilled in the art that the composition of the message node 800 described in conjunction with FIG. 8 is non-limiting and in other embodiments components included in the message node 800 may differ from the components depicted in FIG. 8.

As mentioned above, the composition of the message node 800 includes the plurality of attributes (e.g., the attributes 310). Each attribute of the plurality of attributes is stored at a corresponding attribute vertex node of the executable graph-based model 100, where attribute vertex node is a vertex node that stores attribute value of a corresponding attribute. In embodiments, when an attribute stores a composite data, every data of the composite data is stored at a corresponding vertex node and are collectively joined to the message node 800 by way of an attribute edge node that also includes role for every data of the composite data.

To summarize, the executable graph-based model 100 includes a plurality of attribute vertex nodes and a plurality of attribute edge nodes that, collectively, store composition of each message node of the executable graph-based model 100. Each message node is associated with one or more attribute vertex nodes of the plurality of attribute vertex nodes, with the one or more attribute vertex nodes configured to store the composition of the corresponding message node. Further, each message node of the plurality of message nodes is associated with one or more attribute vertex nodes that store composite data (e.g., attribute value for the attribute 'created on' is a combination of 'Year', 'Month', and 'Day' data) by way of one or more attribute edge nodes of the plurality of attribute edge nodes, respectively, with the one or more attribute edge nodes defining the association between the one or more vertex nodes and the corresponding message node.

Moreover, the composition of the message node 800 is not permanently stored in the executable graph-based model 100. The composition of the message node 800 is loaded in such attribute vertex nodes whenever the message node 800 is to be analyzed.

Figure 9:
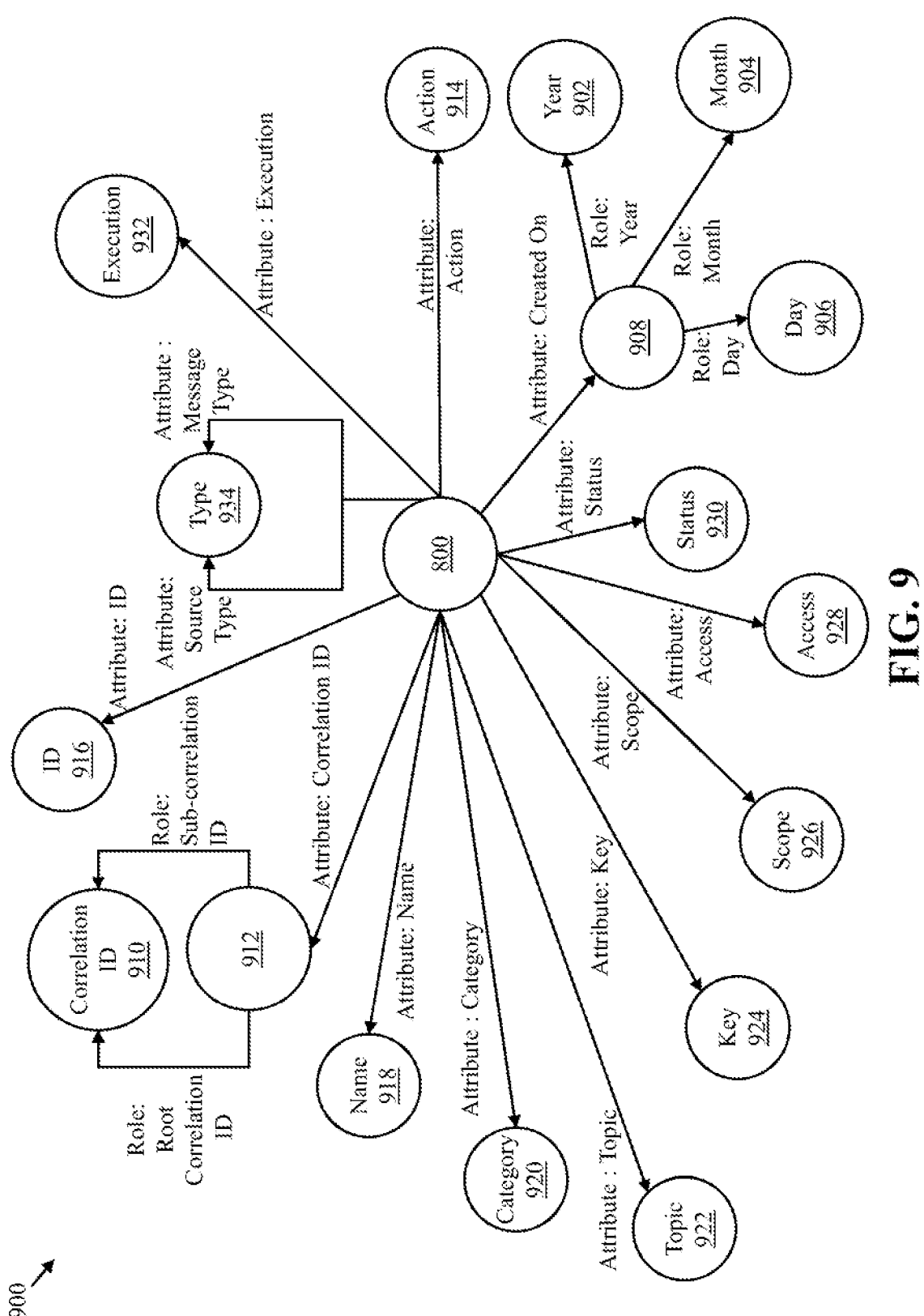
FIG. 9 is a graph that represents the composition of the message node of FIG. 8 in the executable graph-based model, in accordance with an embodiment of the present disclosure.

FIG. 9 is a graph 900 that represents the composition of the message node 800 in the executable graph-based model 100, in accordance with an embodiment of the present disclosure. Referring to FIG. 9, the plurality of attributes of the message node 800 are stored at a plurality of nodes 902-934 that includes a set of attribute vertex nodes and a set of attribute edge nodes. The set of attribute vertex nodes, collectively, store the plurality of attributes of the message node 800. Each attribute of the plurality of attributes is stored in the set of attribute vertex nodes as value shared attributes or non-value shared attributes. An attribute vertex node that stores an attribute value of a value shared attribute is coupled to the message node 800 as well as one or more other message nodes. Therefore, the attribute value of such value shared attribute may be included in the composition of the message node 800 and compositions of the one or more other message nodes, and hence, is shared among the message node 800 and the one or more other message nodes. An attribute vertex node that stores an attribute value of a non-value shared attribute of the message node 800 is coupled only to the message node 800. Therefore, non-value shared attributes are exclusive to a single message node. Each of the attribute vertex node of the set of attribute vertex nodes store an attribute value of one of the value shared attributes (e.g., the attributes 'Correlation ID' 804, 'Topic' 810, 'Scope' 814, or the like).

As shown, the message node 800 is coupled to the attribute vertex nodes 902-906 that, collectively, store the attribute value of the attribute 'Created-On Timestamp' 824 of the message node 800, where the attribute value of the attribute 'Created-On Timestamp' 824 is composite data. The attribute vertex nodes 902-906 are associated with the message node 800 by way of an attribute edge node 908. The attribute edge node 908 includes roles for the message node 800 and the attribute vertex nodes 902-906. The roles are indicative of an association between the message node 800 and the attribute vertex nodes 902-906. The attribute edge node 908 includes a role (not shown) 'is created on' for the message node 800 and roles 'Year', 'Month', and 'Day' for the attribute vertex nodes 902, 904, and 906, respectively.

Notably, the attribute 'Created-On Timestamp' 824 is a value shared attribute. Hence, the attribute vertex nodes 902-906 that, collectively, store the attribute value for the attribute 'Created-On Timestamp' 824 may also be coupled to one or more other message nodes that may have same attribute value for at least one of the attributes 'Created-On Timestamp' 824 'Raised-On Timestamp' 826, 'Received-On Timestamp' 828, 'Handled-On Timestamp' 830, and 'Processed-On Timestamp' 832.

Similarly, the message node 800 may be coupled to other attribute vertex nodes, that store other composite data for attribute values of corresponding attributes, via other attribute edge nodes with roles 'raised on', 'received on', 'processed on', 'handled on', and 'subscribed on'. Such attribute vertex nodes may store attribute values for the attributes 'Raised-On Timestamp' 826, 'Received-On Timestamp' 828, 'Handled-On Timestamp' 830, and 'Processed-On Timestamp' 832 of the message node 800. For the sake of brevity, only the attribute vertex nodes 902, 904, and 906 that store the attribute values for the attribute 'Created-On Timestamp' 824 of the message node 800 is shown in FIG. 9.

The message node 800 is further coupled to one or more attribute vertex nodes such as an attribute vertex node 'Correlation ID' 910 that stores attribute values for the attribute 'Correlation ID' 804 of the message node 800. In embodiments, when the message node 800 is not correlated to any other node or is a root node, an attribute value associated with the attribute 'Correlation ID' 804 is non-composite data. In embodiments, when the message node 800 is correlated to one or more other message nodes and may not be a root message node, the attribute value associated with the attribute 'Correlation ID' 804 is composite data. In such embodiments, the attribute value associated with the attribute 'Correlation ID' 804 may be stored at two or more attribute vertex nodes that may be coupled to the message node 800 via a corresponding attribute edge node. As shown, an attribute vertex node 'Correlation ID' 910 stores the attribute value for the attribute 'Correlation ID' 804. The attribute vertex node 'Correlation ID' 910 is coupled to the message node 800 by way of an attribute edge node 912. The attribute edge node 912 may include role (not shown) for the message node 800 and role 'Root Correlation ID' or 'Sub-Correlation' ID for the attribute vertex node 'Correlation ID' 910.

For the sake of brevity, FIG. 9 is shown to include a single attribute vertex node that stores an attribute value for the attribute 'Correlation ID 804' associated with the message node 800. In other embodiments, the message node 800 may be associated with one or more other attribute vertex nodes that may store one or more correlation IDs associated with the message node 800.

As shown, the message node 800 is coupled to an attribute vertex node 914 that stores the attribute value of the attribute 'Action' 822 of the plurality of attributes shown in FIG. 8. The attribute 'Action' 822 is a value shared attribute. The message node 800 has the attribute value, for the attribute 'Action' 822, that is stored at the attribute vertex node 914.

As shown, the message node 800 is further associated with the attribute vertex node 916 that stores the attribute value of the attribute 'ID' 802 of the message node 800. The attribute value of the attribute 'ID' 802 stored at the attribute vertex node 'ID' 916 may be a non-value shared attribute. Similarly, the message node 800 may be associated with other attribute vertex nodes that store attribute values of the attributes 'Publisher ID' 834, 'Subscriber ID' 836, 'Retry Source ID' 844 and additional attributes such as 'User ID' and 'Source ID', of the message node 800.

The message node 800 may be associated with attribute vertex nodes 918-932 that may store attribute values of the attributes 'Name' 806, 'Category' 808, 'Topic' 810, 'Key' 812, 'Scope' 814, 'Access' 816, 'Status' 818, and 'Execution' 820, respectively, associated with the message node 800. The message node 800 may be further associated with the attribute vertex node 934 that stores an attribute value of the attribute 'Message Type' 848 of the message node 800. The attribute vertex node 934 may store attribute values for attributes 'Message Type' 848 and 'Source type 854' of the message node 800. For the sake of brevity, a single attribute vertex node 934 is shown to store attribute values for the attributes 'Message Type' 848 and 'Source type 854'. In other embodiments, the attribute values for the attributes 'Message Type' 848 and 'Source type 854' may be stored at different attribute vertex nodes.

In an instance, the attribute vertex node 934 may store the attribute value for the attribute 'Message Type' 848. That is to say that, the attribute vertex node 934 may store a message type (for example, a command message or an event message) of the message represented by the message node 800. In another instance, the attribute vertex node 934 may store the attribute value for the attribute 'Source Type' 854. That is to say that, the attribute vertex node 934 may store a message type (for example, a command message or an event message) of a message, processing of which has led to generation of the message represented by the message node 800.

In some embodiments, during stimulus processing of the stimulus 230, when the composition of the message node

800 is to be determined, the analytics module 240 is configured to track the attribute vertex nodes and/or the attribute edge nodes coupled with the message node 800 to determine the set of attribute vertex nodes that, collectively, store the composition of the message node 800. As mentioned above, an attribute vertex node that stores a value shared attribute may be associated with multiple message nodes. Therefore, based on an attribute value of an attribute, one or more messages that are associated with the value of the attribute may be identified. For example, a query may include a publisher ID that may be stored at an attribute vertex node. Therefore, tracking of the message edge nodes associated with the attribute vertex node may lead to identification of message nodes that have the publisher ID that is stored at the attribute vertex node. Hence, all the messages that are published by a publisher overlay node having the publisher ID may be identified with a single query and without having to search for each message node in the executable graph-based model 100.

In some embodiments, the storage management module 220 may be configured to process one or more attributes associated with the message node 800 and corresponding attribute values prior to storage thereof at corresponding attribute vertex nodes of the set of vertex nodes. The processing may be performed when a data structure associated with the one or more attributes may be incompatible with a native data structure/file system associated with the overlay system 202. In an example, the message node 800 may represent a message that is received by the overlay system 202 from another system for performing message management. The received message may be generated by a file system having a data structure which is incompatible with the overlay system 202. In such an example, the storage management module 220 may process attributes associated with the message node 800 prior to its storage at the set of attribute vertex nodes.

As mentioned above, the executable graph-based model 100 may include a plurality of message nodes (for example, the message nodes 602f, 604e, 800) that represent a plurality of messages associated with the overlay system 202. One or more messages of the plurality of messages may be generated within the overlay system 202 or may be received by the overlay system 202 from an external system associated therewith. The plurality of messages may include messages that may be correlated with each other. Such correlation of messages is described in conjunction with FIG. 10.

Figure 10:
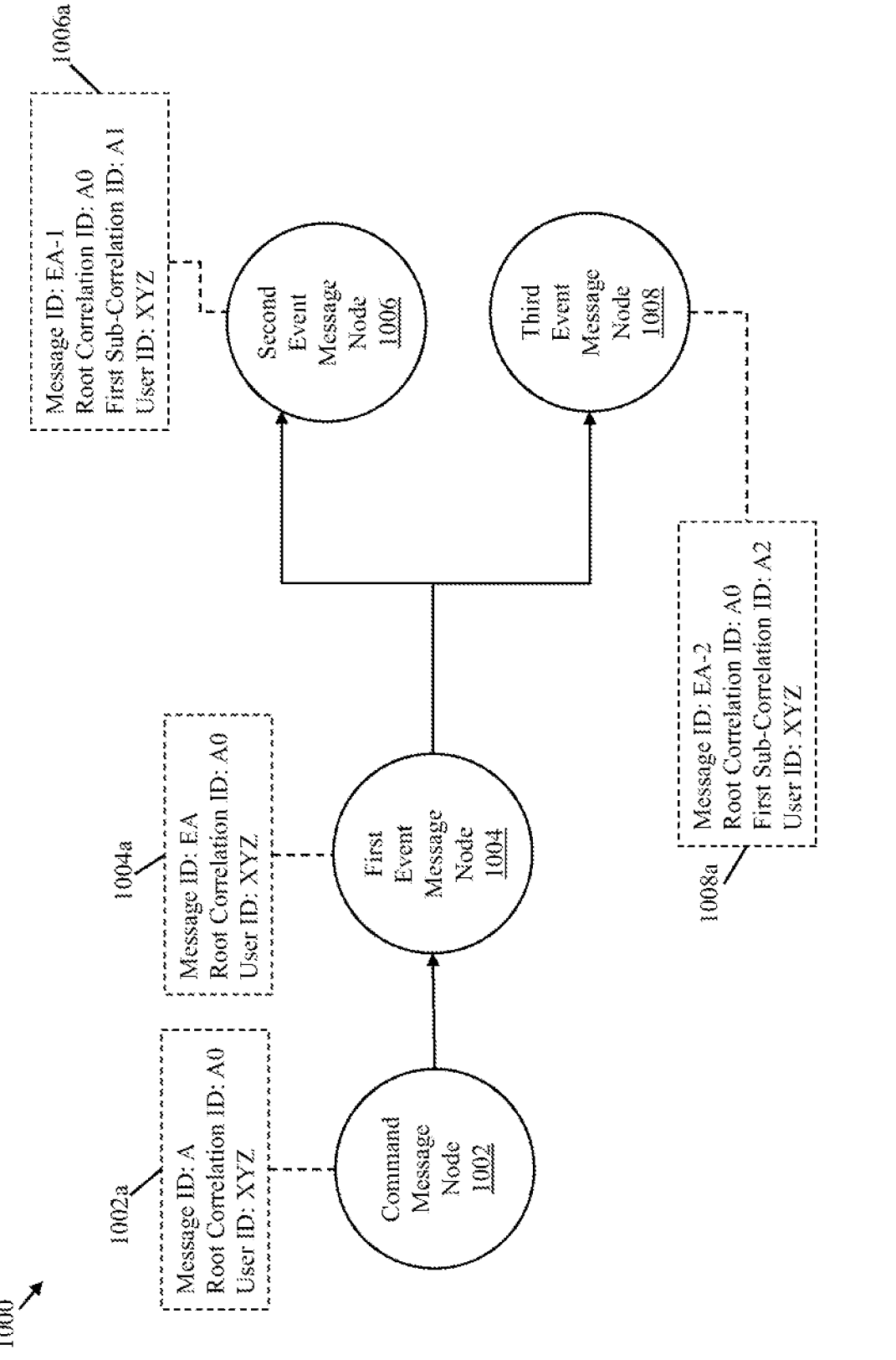
FIG. 10 is a block diagram that illustrates a compact view of a set of correlated message nodes of the executable graph-based model, in accordance with an embodiment of the present disclosure.

FIG. 10 is a block diagram 1000 that illustrates a compact view of a set of correlated message nodes of the executable graph-based model 100, in accordance with an embodiment of the present disclosure. Referring to FIG. 10, the set of correlated messages nodes (for example, a command message node 1002, a first event message node 1004, a second event message node 1006, and a third event message node 1008) of the executable graph-based model 100 is illustrated. The set of correlated message nodes represents a set of correlated messages of the plurality of messages associated with the overlay system 202. The set of correlated messages may include a message (for example, a command message represented by the command message node 1002) that may be correlated with one or more other message of the set of correlated messages. The command message by an initial message of the set of correlated messages. The initial message may be a parent/root message to a first set of child messages (for example, a first event message represented by the first event message node 1004). The first set of child messages may be generated based on processing of the parent/root message. That is to say, the first event message may be generated based on the processing of the parent/root message.

Further, a second set of child messages (for example, second and third event messages represented by the second and third event message nodes 1004 and 1006) is generated based on processing of at least one message (for example, the first event message represented by the first event message node 1004) of the first set of child messages. A parent message node (for example, the command message node 1002) that represents the parent message (for example, the command message) and a first set of child message nodes (for example, the first event message node 1004) that represent the first set of child messages (for example, the first event message) are instantiated by the message management module 214.

The parent message node and the first set of child message nodes are associated with a root correlation ID (for example, root correlation ID 'A0') that is indicative of a transactional operation associated with the root message for executing a first transaction in the executable graph-based model 100 in response to the one or more stimuli received before the stimulus 230. The association of the root correlation ID (for example, root correlation ID 'A0') with the parent message node (for example, the command message node 1002) and the first set of child message nodes (for example, the first event message node 1004) indicates a causal association between the root message and the first set of child messages. The root correlation ID is further associated with each message node of the second set of child message nodes (for example, the second and third event message nodes 1006 and 1008) that indicates existence of a causal association between the parent message node, the first set of child message nodes, and the second set of child message nodes. Each message of a second set of child message nodes is associated with a corresponding first sub-correlation ID (for example, the second event message node 1006 is associated with a first sub-correlation ID 'A1' and the third event message node is associated with a different value of the first sub-correlation ID, for example a first sub-correlation ID 'A2'). That is to say that, the first sub-correlation ID associated with each of the second set of child message nodes is different and is indicative of a distinct transactional operation associated with a corresponding child message of the second set of child messages. The transactional operation is executed for performing a corresponding transaction in the executable graph-based model 100.

For the sake ongoing description, the parent/root message is assumed to be a command message, the three child messages are assumed to be first, second, and third event messages. Specifically, the first set of child messages is assumed to include the first event message and the second set of child messages is assumed to include the second and third event messages.

As shown in FIG. 10, the command message is represented by the command message node 1002, the first event message is represented by the first event message node 1004, the second event message is represented by the second event message node 1006, and the third event message is represented by the third event message node 1008. The command message node 1002 and the first through third event message nodes 1004-1008 are generated based on the stimulus that is different from the stimulus 230. Such stimulus is indicative of communication and processing of the parent/root message, the first set of child messages, and the second set of child messages. Also, such stimulus is received prior to the stimulus 230, where the stimulus 230 is received for analysis of the parent/root message, the first set of child messages, and the second set of child messages.

The command message node 1002 shown herein is a parent message node to the first event message node 1004. That is to say that, the command message node 1002 has a causal association with the first event message node 1004. The command message node 1002 is coupled with the first event message node 1004 by way of a corresponding message edge that includes roles for each of the command message node 1002 and the first event message node 1004. Such roles are indicative of the causal association between the command message node 1002 and the first event message node 1004 and further indicates a manner in which the command message node 1002 and the first event message node 1004 are associated with each other. In an embodiment, identification of one or more correlated messages may be performed based on tracking of message edge nodes associated with a message that is to be analyzed.

As shown within a dotted box 1002a, the command message node 1002 is associated with a message ID 'A', a root correlation ID 'A0', and a user ID 'XYZ'. The message ID 'A' is unique and is used to identify the command message node 1002. The root correlation ID 'A0' is indicative of a first transaction associated with the command message node 1002 that is to be executed in the executable graph-based model 100. The processing of the command message represented by the command message node 1002 leads to generation of the first event message that is represented by the first event message node 1004. As shown within another dotted box 1004a, the first event message node 1004 is associated with a message ID 'EA', the root correlation ID 'A0', and the user ID 'XYZ'. The message ID 'EA' is unique and is used to identify the first event message node 1004. The association of the root correlation ID 'A0' with the first event message node 1004 is indicative of a causal association between the command message node 1002 and the first event message node 1004. The term 'causal association' is indicative of generation of one message being caused by processing of another message. That is to say that, the first event message is generated based on processing of the command message. Hence, the command message node 1002 is parent message node to the first event message node 1004. The association of the root correlation ID 'A0' with the first event message node 1004 is further indicative of the first event message being generated as a part of execution of the first transaction associated with the command message node 1002.

Based on processing of the first event message, the second and third event messages are generated. The second and third event messages are clone event messages of the first event message. The second and third event messages are generated based on subscription of the first event messages by two subscribers (for example, handler overlay nodes). The second and third event message nodes 1006 and 1008 represent the clone event messages of the first event message node 1004. A first portion of compositions of the second and third event message nodes 1006 and 1008 are common and a second portion of the compositions are exclusive to each of the second and third event message nodes 1006 and 1008. The first portion of the compositions of the second and third message nodes 1006 and 1008 may include attributes such as, created on, source ID, category, topic, publisher ID, published on, or the like. The second portion of the compositions of the second and third message nodes 1006 and 1008 may include attributes such as subscribed on, processed on, raised on, subscriber ID, or the like.

The second event message node 1006 that represents the second event message is associated with a message ID 'EA-1', the root correlation ID 'A0', a first sub-correlation ID 'A1', and the user ID 'XYZ'. The association of the root correlation ID with the second event message node 1006 indicates that the second event message is generated as a part of the execution of the first transaction and that the second event message node is a child message node to the command message node 1002 and the first event message node 1004. The association of the first sub-correlation ID 'A1' with the second event message node 1006 is indicative of a second transaction being executed in response to execution of the second event message node 1006. The first sub-correlation ID 'A1' is different from the root correlation ID 'A0' which indicates that the second transaction is different from the first transaction. Further, the association of both the root correlation ID 'A0' and the first sub-correlation ID 'A1' is indicative of the second transaction being a sub-transaction to the first transaction. The third event message node 1008 that represents the third event message is associated with a message ID 'EA-2', the root correlation ID 'A0', a first sub-correlation ID 'A2', and the user Id 'XYZ'. The association of the root correlation ID 'A0' with the third event message node 1008 indicates that the command message node 1002 and the first event message node 1004 are parent message nodes to the third event message node 1006. The association of the root correlation ID 'A0' with the third event message node 1008 further indicates that the third event message is generated as a part of the execution of the first transaction. The association of the first sub-correlation ID 'A2', that is different from the first sub-correlation ID 'A1' associated with the second with the second event message node 1006, with the third event message node 1008 is indicative of a third transaction being executed in response to execution of the third event message. The second sub-correlation ID 'A2' is different from the root correlation ID 'A0' which indicates that the third transaction is different from the first transaction. Further, the association of both the root correlation ID 'A0' and the second sub-correlation ID 'A2' is indicative of the third transaction being a sub-transaction to the first transaction.

The association of a common correlation ID (for example, the root correlation ID 'A0') with two or more message nodes is indicative of a causal association therebetween. Further, an association with a new correlation ID (for example, the first sub-correlation IDs 'A1' and 'A2') is indicative of a new transaction being initiated based on processing of a message represented by a corresponding message node. Moreover, the association of the user ID 'XYZ' with the command message node 1002 and the first through third event message nodes 1004-1008 indicates that the command message node 1002 and the first through third event message nodes 1004-1008 are associated with the same user that has the user id 'XYZ'.

In an embodiment, the stimulus 230 may be indicative of an analysis to be performed for the command message represented by the command message node 1002. In such an embodiment, the analytics module 240 may be configured to track the first, second, and third event message nodes 1004-1008 that are correlated to the command message node 1002. The analytics module 240 may track the first, second, and third event messages based on correlation ID, for example, the root correlation ID 'A0' associated therewith. The analytics module 240 may be configured to execute the operation associated with the stimulus 230 based on the command message node 1002 and the first through third event message nodes 1004-1008.

In some embodiments, correlation among two or more message nodes may be further identified based on message edge nodes and attribute values of attributes source ID, publisher ID, topic, category, user ID, a combination thereof, or any other element of compositions of the two or more message nodes. Such correlation may be established based on identical attribute values of such attributes in the compositions of the two or more messages.

It will be apparent to a person skilled in the art that the executable graph-based model 100 may include a plurality of message nodes that may include multiple sets of correlated message nodes as well as one or more message nodes that may not be correlated with any other message node.

In FIG. 10, the set of correlated message nodes (for example, the command message node 1002 and the first through third message nodes 1004-1008) are illustrated in the compact form. That is to say that, compositions, overlays, attribute vertex nodes, attribute edge nodes, and message edge nodes associated therewith are not shown in FIG. 10. While performing analytics on any message node, compositions, overlays, attribute vertex nodes, attribute edge nodes, and message edge nodes associated therewith may be used by the analytics module 240. Therefore, it is important to understand an organization of the compositions, overlays, attribute vertex nodes, attribute edge nodes, and message edge nodes associated with the set of correlated messages in the executable graph-based model 100.

Figure 11A:
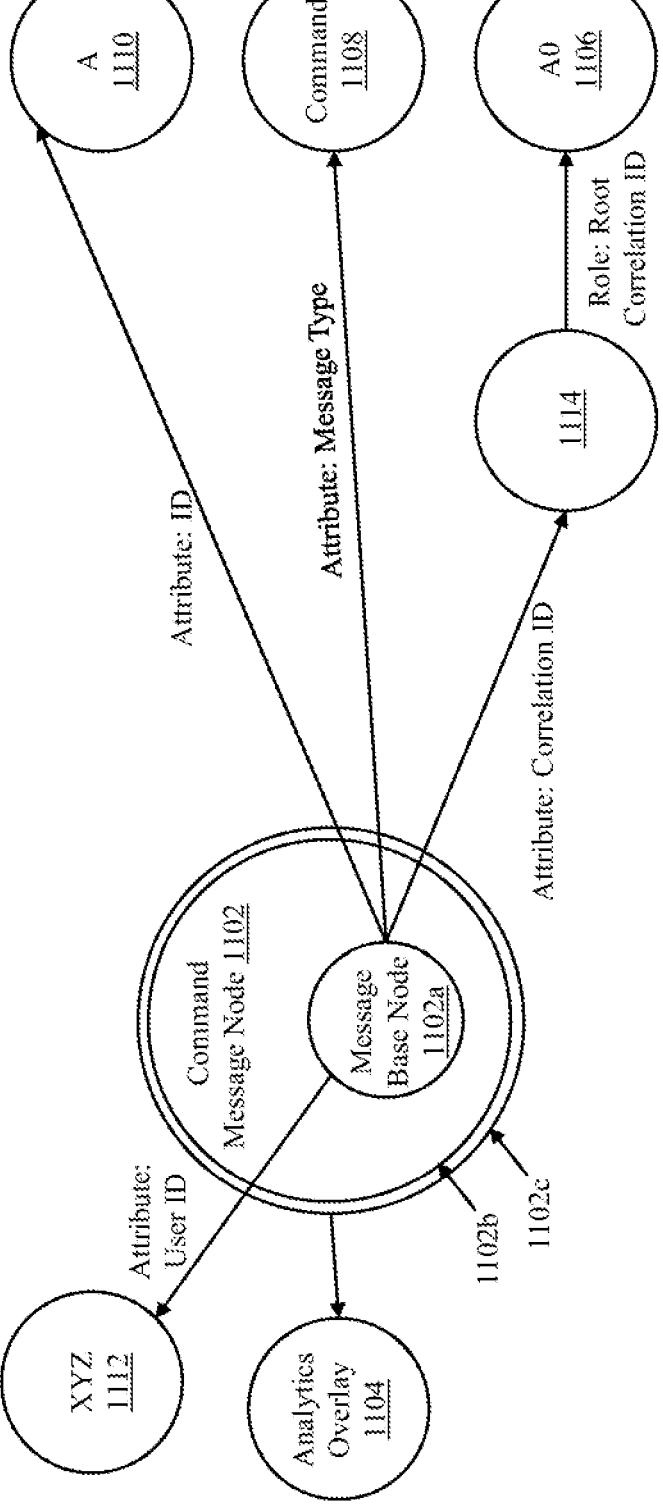
FIGS. 11A and 11B are graphs that, collectively, illustrate a detailed view of the set of correlated message nodes in the executable graph-based model, in accordance with an embodiment of the present disclosure.
Figure 11B:

FIGS. 11A and 11B are graphs 1100A and 1100B that, collectively, illustrate a detailed view of the set of correlated message nodes in the executable graph-based model 100, in accordance with an embodiment of the present disclosure.

Referring to FIG. 11A, the command message node 1002 (hereinafter referred to as command message node 1102) of the set of correlated message nodes is an executable node and is shown to include a message base node 1102a represented as a circle that is enclosed within another circle 1102b that, collectively, represent the command message of the set of correlated messages. Further, an outer circle 1102c encloses the command message node 1102 which indicates that the command message node 1102 is extended by way of an overlay node (for example, an analytics overlay node 1104). Further, the message base node 1102a of the command message node 1102 is shown to be associated with a plurality of attribute vertex nodes 1106-1112. The attribute vertex node 1106 is associated with the command message node 1102 via an attribute edge node 1114. The attribute edge node 1114 indicates that the attribute vertex nodes 1106 stores an attribute 'Correlation ID' for the command message node 1102. The attribute edge node 1114 further indicates that the attribute vertex node 1106 stores an attribute 'Root Correlation ID' of the command message node 1102. The attribute vertex node 1106 stores an attribute value 'A0' for the attribute 'Root Correlation ID'. The attribute vertex node 1108 associated with the command message node 1102 stores an attribute value 'Command' for the attribute 'Message Type' associated with the command message node 1102. The attribute value 'Command' stored at the attribute vertex node 1108 indicates a type (for example, a command message type) of the message that is represented by the command message node 1102. The attribute vertex node 1110 is associated with the command message node 1102 and stores an attribute value 'A' of the attribute 'ID' associated with the command message node 1102. Further, the attribute vertex node 1112 is associated to the command message node 1102 and stores an attribute value 'XYZ' of the attribute 'User ID' associated with the command message node 1102.

Referring now to FIG. 11B, the graph 1100B illustrates the command message node 1102, the analytics overlay node 1104, a message edge node 1116, a message edge node 1118, the first event message node 1004 (hereinafter referred to as 'an event header node 1120'), and the second event message node 1006 (hereinafter referred to as 'a handled event node 1122'). For the sake of brevity, only the handled event node 1122 is shown in FIG. 11B. In other embodiments, one or more other clone message nodes (for example, the third event message node 1008) may be also represented similarly.

The event header node 1120 represents the first event message that is the source message for the second and third event messages. As mentioned earlier, the second event message, represented by the handled event node 1122, is a clone of the first event message. Moreover, the composition of the event header node 1120 includes a first portion that is a static portion and a second portion that is a dynamic portion. The first portion includes the attribute values for the attributes 'ID', 'Correlation ID', 'User ID', 'Name', 'Category', 'Topic', 'Key', 'Scope', 'Execution', 'Created-On', 'Raised-On', 'allow retry', 'maximum retry allowed', 'source ID', 'source type', and 'Action'. The first portion further includes data associated with the first event message. The attribute values of the attributes in the first portion of the composition remain static and same for each clone that is created for the event header node 1120. The second portion includes the attribute values for the attributes, 'Received-On', 'Handled-On', 'Processed-On', 'publisher ID', 'subscriber ID', 'current retry count', and 'retry source ID'. The attribute values of the attributes in the second portion of the composition are dynamic and, hence, vary for each clone that is created for the event header node 1120.

Therefore, the handled event node 1122 include the first portion of the composition of the event header node 1120 message as own composition thereof. That is to say that, attribute values for the attributes 'ID', 'Correlation ID', 'User ID', 'Name', 'Category', 'Topic', 'Key', 'Scope', 'Execution', 'Created-On', 'Raised-On', 'allow retry', 'maximum retry allowed', 'source ID', 'source type', and 'Action' of the handled event node 1122 are same as the attribute values of the attributes 'ID', 'Correlation ID', 'User ID', 'Name', 'Category', 'Topic', 'Key', 'Scope', 'Execution', 'Created-On', 'Raised-On', 'allow retry', 'maximum retry allowed', 'source ID', 'source type', and 'Action', respectively, of the event header node 1120. The data included in the handled event node 1122 is same as the event header node 1120. Further, attribute values of the attributes 'Received-On', 'Handled-On', 'Processed-On', 'publisher ID', 'subscriber ID', 'current retry count', and 'retry source ID', are specific to the second event message represented by the handled event node 1122.

As shown, the first message edge node 1116 is a command-to-event header message edge node. The first message edge node 1116 couples the command message node 1102 with the event header node 1120. The first message edge node 1116 includes a role 'Command' for the command message node 1102 and another role 'Event Header' for the event header node 1120. The command message node 1102 is further associated with an attribute vertex node 1124. The attribute vertex node 1124 is associated with the command message node 1102 and stores an attribute value of the attribute 'ID' associated therewith.

As shown, the first message edge node 1116 is represented by way of two concentric circles that is indicative of association of an overlay therewith. The first message edge node 1116 is associated with an analytics overlay node 1126.

The analytics overlay node 1126 being an overlay of the first message edge node 1116, may execute corresponding set of analytics operations on compositions of the command message node 1102 and the event header node 1120 that are associated with the first message edge node 1116.

As shown, the event header node 1120 is further associated with an attribute vertex node 1128 that stores an attribute value 'Event' of the attribute 'Message type' associated with the event header node 1120. The event header node 1120 is further associated with another attribute vertex node 1130 that stores an attribute value 'Command' of the attribute 'Source type' associated with the event header node 1120. The event header node 1120 is further associated with the attribute vertex node 1124 that stores an attribute value 'A' of the attribute 'Source ID' associated with the event header node 1120. The attribute 'Source ID' indicates that the attribute value 'A' stored at the attribute vertex node 1124 is message ID of another message that has caused generation of the first event message represented by the event header node 1120. The attribute vertex node 1124 is further associated with another message node (e.g., the command message node 1102) and stores attribute value 'A' for the attribute 'ID' associated therewith. This indicates that the other message (e.g., the command message represented by the command message node 1102) is a source message of the first event message (represented by the event header node 1120). The event header node 1120 is further associated with the attribute vertex node 1106 that stores an attribute value 'A0' of the attribute 'correlation ID' for the event header node 1120. The event header node 1120 is associated with the attribute vertex node 1106 via an attribute edge node 1132. Notably, an attribute value of the attribute 'correlation ID' associated with the first event message is same as the attribute value of the attribute 'correlation ID' associated with the command message. Moreover, the event header node 1120 is extended by way of an analytics overlay node 1134 that may execute corresponding set of analytics operations of the composition of the event header node 1120.

The second message edge node 1118 is a command-to-handled event message edge node. The second message edge node 1118 is represented by a dotted circle that encompasses the first message edge node 1116. This is indicative of the second message edge node 1118 inheriting the first message edge node 1116. The second message edge node 1118 inherits the role 'Command' for the command message node 1102 from the first message edge node 1116. The second message edge node 1118 includes a role 'Handled Event' for the handled event node 1122. The second message edge node 1118 further inherits every property and capability of the first message edge node 1116. That is to say that, the second message edge node 1118 inherits the analytics overlay 1126 and may access the command message node 1102 and the event header node 1120. Further, the second message edge node 1118 is represented by two concentric circles that indicates that the second message edge node 1118 is extended by an analytics overlay node for example, an analytics overlay node 1136. The analytics overlay node 1136 may execute corresponding set of analytics operations on the compositions of the command message node 1102 and the handled event node 1122. Further, the analytics overlay node 1136 is shown by way of a dotted circle that encompasses the analytics overlay node 1126 and such representation is indicative of the analytics overlay node 1136 inheriting the analytics overlay node 1126. Therefore, the analytics overlay node 1136 may execute set of analytics operations associated therewith as well as the set of analytics operations associated with the analytics overlay node 1126 on the compositions of the command message node 1102, the event header node 1120, and the handled event node 1122.

As shown, the handled event node 1122 is depicted by way of a dotted circle that encompasses the event header node 1120. Such representation of the handled event node 1122 indicates that the handled event node 1122 inherits the event header node 1120. Therefore, the composition and overlays (for example, the analytics overlay node 1134) of the event header node 1120 are inherited by the handled event node 1122. Further, the handled event node 1122 is represented by two concentric circles that indicates association thereof with at least one overlay node. The handled event node 1122 is extended by way of an analytics overlay node 1138 that is represented by way of a dotted circle that encompasses the analytics overlay node 1134. Such representation of the analytics overlay node 1138 indicates that it inherits the analytics overlay node 1134 of the event header node 1120. Therefore, the analytics overlay node 1138 may execute corresponding set of analytics operations and the set of analytics operations associated with the analytics overlay node 1134 on the compositions of the event header node 1120 and the handled event node 1122.

The handled event node 1122 is shown to be further associated with an attribute vertex node 1140 that stores an attribute value 'EA-1' for the attribute 'Message ID' associated with the handled event node 1122. The handled event node 1122 is shown to be further associated, via an attribute edge node 1142, with an attribute vertex node 1144 that stores an attribute value 'A1' for the attribute 'correlation ID' associated with the handled event node 1122. The attribute edge node 1142 further includes a role 'First Sub-correlation ID' for the attribute vertex node 1144. The role 'First Sub-correlation ID' indicates that the attribute value 'A1' stored at the attribute vertex node 1144 is a 'first sub-correlation ID' for the handled event node 1122. The attribute edge node 1142 is shown by way of a dotted circle that encloses the attribute edge node 1132. Such representation indicates that the attribute edge node 1142 inherits the attribute edge node 1132. Therefore, the attribute edge node 1142 further inherits the association with the attribute vertex node 1106 that stores the attribute value 'A0'. The attribute edge node 1142 inherits the role 'Root Correlation ID' for the attribute vertex node 1106. Therefore, the attribute edge node 1142 couples the handled event node 1122 with the attribute vertex nodes 1106 and 1144. The attribute vertex nodes 1106 and 1144 are coupled with the handled event node 1122 by way of the roles 'Root Correlation ID' and 'First Sub-correlation ID', respectively. Hence, the handled event node 1122 has the attribute values 'A0' and 'A1' for the attributes 'Root Correlation ID' and 'First Sub-correlation ID', respectively.

In an embodiment, an analysis for the command message node 1102, the event header node 1120, and the handled event node 1122 may be performed. In such an embodiment, at least one of the analytics overlay nodes 1104, 1126, 1134, 1136, and 1138 may perform such analytics based on a type of analytics (descriptive analytics, diagnostic analytics, predictive analytics, prescriptive analytics, or the like) that is to be performed. The descriptive analytics refers to an analytics operation that, when executed on one or more message or non-message nodes, yields an output that is indicative of 'What happened?' with the one or more message or non-message nodes. The diagnostic analytics refers to an analytics operation that, when executed on one or more message or non-message nodes, yields an output that is indicative of 'Why did it happen?' with the one or more message or non-message nodes. The predictive analytics refers to an analytics operation that, when executed on one or more message or non-message nodes, yields an output that is indicative of 'What is likely to happen?' with the one or more message or non-message nodes. The prescriptive analytics refers to an analytics operation that, when executed on one or more message or non-message nodes, yields an output that is indicative of 'What should be done?' with the one or more message or non-message nodes.

Based on loading of an analytics overlay node (for example, the analytics overlay node 1136) for executing corresponding set of analytic operations, one or more overlays that are inherited thereby (for example, the analytics overlay node 1126) also gets loaded with corresponding data and processing logic.

In some instances, the analytics overlay node 1136 may use the analytics overlay node 1104 and the analytics overlay node 1134 for performing analytics of the command message node 1102 and the event header node 1120, respectively. In such instances, the analytics overlay node 1136 may be dependent on the analytics overlay nodes 1104 and 1134. Therefore, based on loading of an analytics overlay node (for example, the analytics overlay node 1136) for executing corresponding set of analytic operations, one or more overlays on which the analytics overlay node may have dependency (for example, the analytics overlay nodes 1104 and 1134) also gets loaded with corresponding data and processing logic.

In some embodiments, an analytics overlay node (for example, the analytics overlay node 1136) may be a shared analytics overlay node. In such embodiments, the analytics overlay node 1136 may be also associated with one or more other message nodes. Hence, the set of analytics operations associated with the analytics overlay node 1136 may be also executed on compositions of the one or more other message nodes.

In some embodiments, the analytics overlay node 1136 may be a stateful overlay. The stateful overlay is persistent in nature and gets stored in the storage device associated with the overlay system 202. In such embodiments, analytic insights determined by the analytics overlay node 1136 also gets stored along with the analytics overlay node 1136. Such analytics insights may be loaded from the storage device along with the analytics overlay node 1136 and may be used as and when required. Additionally, in such embodiments, the analytics overlay node 1136 may be a shared overlay. That is to say, the analytics overlay node 1136 may be associated with two or more message nodes or non-message nodes. Alternatively, the analytics overlay node 1136 maybe a non-shared overlay. That is to say, the analytics overlay node 1136 may be exclusive to a single node (a message node or a non-message node) for example, the second message edge node 1118.

In some embodiments, the analytics overlay node 1136 may be a stateless overlay node. The stateless overlay node is non-persistent in nature and hence is not stored in the storage device associated with the overlay system 202. In such embodiments, the analytic insights determined by the analytics overlay node 1136 cease to persist when the analytics overlay node 1136 gets unloaded. In instances, when such analytics insights are required to be re-used by the overlay system, the analytics insights are required to be re-generated by the analytics overlay node 1136 or some other analytics overlay node. Additionally, in such embodiments, the analytics overlay node 1136 may be a shared overlay. That is to say, the analytics overlay node 1136 may be associated with two or more message nodes or non-message nodes. Alternatively, the analytics overlay node 1136 maybe a non-shared overlay. That is to say, the analytics overlay node 1136 may be exclusive to a single node (a message node or a non-message node) for example, the second message edge node 1118.

Subsequently, based on the analytics insight generated by the analytics overlay node 1136, a publisher overlay node 1146 of the analytics overlay node 1136 may generate and publish an analytics outcome. The analytics outcome is shown to be generated in form of an event message 1148.

In some embodiments, at least one of the analytic insight and the analytics outcome may be stored as an attribute of one of the command message node 1102, the event header node 1120, and the handled event node 1122. In such embodiments, the analytics insight or the analytics outcome stored as the attribute may persist with the corresponding message node that is stored at the storage device associated with the overlay system 202.

Although only the first handled event node 1122 that represents the second event message is shown in FIG. 11B, a second handled event node that represents the third event message may also be shown in a similar manner without deviating from the scope of the disclosure.

For the sake of brevity, message base nodes of the nodes (for example, the command message node 1102, the event header node 1120, the handled event node 1122, the first message edge node 1116, or the like) depicted in FIG. 11B are not shown. It will be apparent to a person skilled in the art that each node includes a corresponding base node without deviating from the scope of the disclosure.

It will be apparent to a person skilled in the art that each message node (for example, the command message node 1102, the event header node 1120, and the handled event node 1122, or the like) is associated with a corresponding set of attribute vertex nodes that stores attribute values of the plurality of attributes associated therewith. For the sake of brevity, only a few attribute vertex nodes are shown to be associated with the message nodes shown in FIGS. 11A and 11B.

Figure 12:
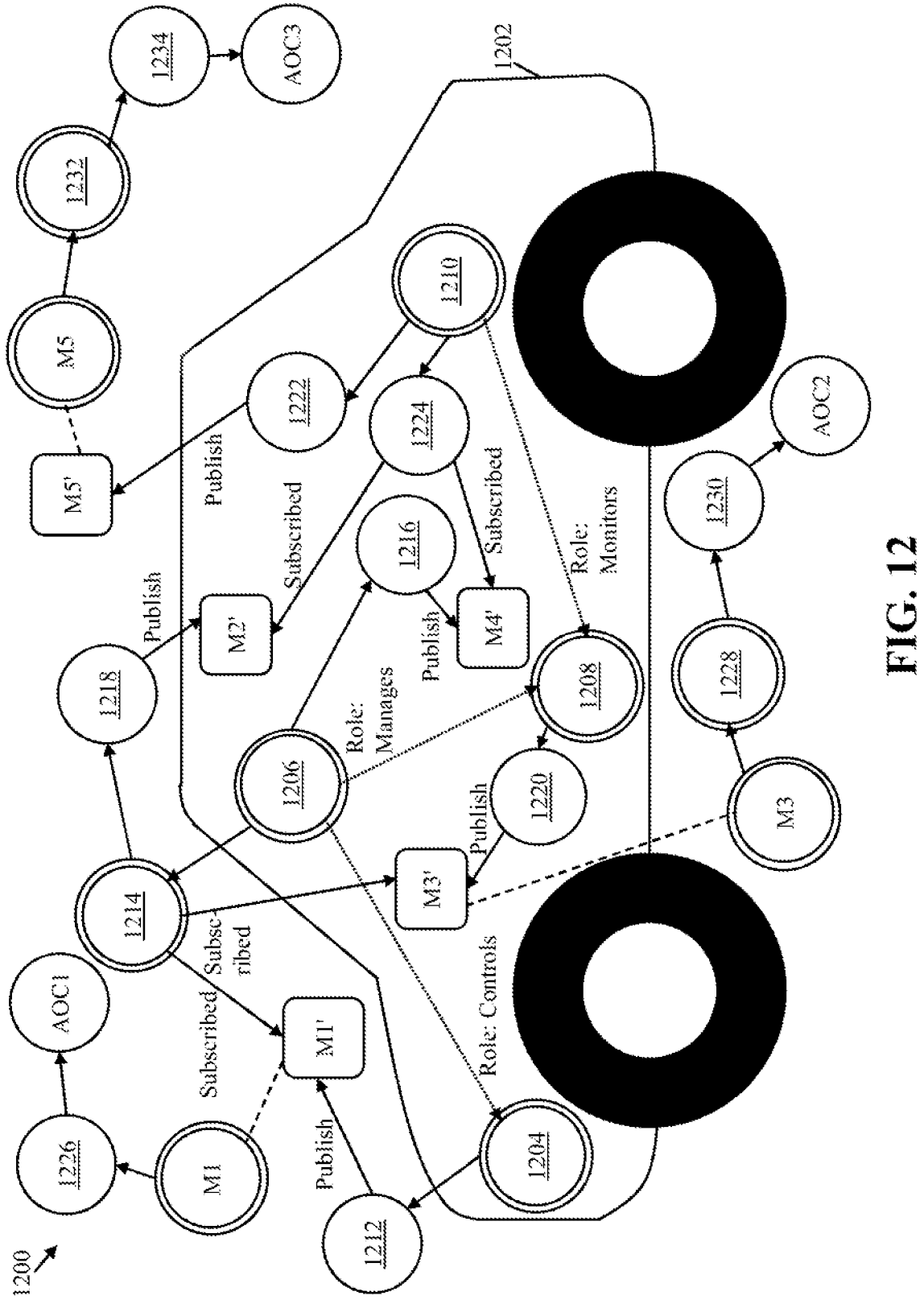
FIG. 12 is a schematic diagram that illustrates an example implementation of message management in an executable graph-based autonomous vehicle model, in accordance with an embodiment of the present disclosure.

FIG. 12 is a schematic diagram that illustrates an example implementation of message management in an executable graph-based autonomous vehicle model 1200, in accordance with an embodiment of the present disclosure. Referring to FIG. 12, the executable graph-based autonomous vehicle model 1200 corresponds to an executable graph-based model generated for an autonomous vehicle 1202 and is hereinafter referred to as the "autonomous vehicle model 1200". The autonomous vehicle 1202 includes various components such as an engine, a vehicle control unit (VCU), a battery, and an on-board diagnostic unit (OBDU). In such a scenario, the autonomous vehicle model 1200 may include various executable nodes that represent the components of the autonomous vehicle 1202. Such executable nodes are connected in a hierarchical structure. The executable nodes in the autonomous vehicle model 1200 are edge-type nodes and are referred to as edges. Edges are linked by way of role-type nodes that are referred to as roles.

As shown in FIG. 12, an executable graph-based model (e.g., the autonomous vehicle model 1200) generated for the autonomous vehicle 1202 thus includes an engine edge 1204, a VCU edge 1206, a battery edge 1208, and an OBDU edge 1210. The VCU edge 1206 is associated with the engine edge 1204 by way of a role 'Controls'. The VCU edge 1206 is associated with the battery edge 1208 by way of a role 'Manages'. The OBDU edge 1210 is associated with the battery edge 1208 by way of a role 'Monitors'. The OBDU edge 1210 is further associated (not shown) with the engine edge 1204 by way of a role 'Monitors'.

The engine edge 1204 is extended to include a publisher overlay node 1212. The VCU edge 1206 is extended to include a handler overlay node 1214 and a publisher overlay node 1216. The handler overlay node 1214 is further extended to include a publisher overlay node 1218. The battery edge 1208 is extended to include a publisher overlay node 1220. The OBDU edge 1210 is extended to include a publisher overlay node 1222 and a handler overlay node 1224. Various components of the autonomous vehicle model 1200 work in tandem to facilitate communication among various components of the autonomous vehicle 1202.

In an instance, the publisher overlay node 1212 of the engine edge 1204 may generate and publish a health status message M1' (represented by a rectangular box) that includes health status of the engine of the autonomous vehicle 1202 during a defined time-interval (for example, 1 day, 2 days, 3 days, or the like). The message management module 214 is configured to instantiate a health status message node M1 for the health status message M1'. The health status message M1' may be subscribed by the handler overlay node 1214 of the VCU edge 1206. Based on processing of the health status message M1' by the handler overlay node 1214, the publisher overlay node 1218 of the handler overlay node 1214 may generate and publish a message M2' (represented by a rectangular box) that is indicative of the health status of the engine during the defined time-interval. The message M2' is subscribed by the handler overlay node 1224 of the OBDU edge 1210.

The publisher overlay node 1220 of the battery edge 1208 generates and publishes a health status message M3' (represented by a rectangular box) that includes health status of the battery of the autonomous vehicle 1202 during the defined time-interval (for example, 1 day, 2 days, 3 days, or the like). The message management module 218 may be configured to instantiate a health status message node M3 for the health status message M3'. The health status message M3' may be subscribed by the handler overlay node 1214 of the VCU edge 1206. Based on processing of the health status message M3' by the handler overlay node 1214, the publisher overlay node 1216 of the VCU edge 1206 may generate and publish a message M4' (represented by a rectangular box) that is indicative of the health status of the battery during the defined time-interval. The message M4' is subscribed by the handler overlay node 1224 of the OBDU edge 1210.

The publisher overlay node 1222 of the OBDU edge 1210 may generate and publish a vehicle health message M5' (represented by a rectangular box) based on the processing of the messages M2' and M4'. The vehicle health message M5' may include vehicle health status associated with the autonomous vehicle 1202 during the defined time-interval. The message management module 218 may be configured to instantiate a vehicle health message node M5 for the vehicle health message M5'.

As shown, the health status message node M1 is extended to include an analytics overlay node 1226. In an embodiment, the analytics overlay node 1226 may be the diagnostic analytics overlay node. The diagnostic analytics overlay node includes processing logic that when executed is configured to process composition of the health status message node M1 to identify one or more patterns that are indicative of a current performance of the engine of the autonomous vehicle 1202. The analytics module 240 may be configured to use the analytics overlay node 1226 to execute corresponding set of analytics operations on composition of the health status message node M1 to generate an analytic insight. Based on the generated analytic insight the analytics module 240 may be configured to generate, using the analytics overlay node 1226, an analytics outcome AOC1 (for example, a diagnostic analytics outcome). The analytics outcome AOC1 may be indicative of a pattern of overheating of the engine when operated in a first mode of operation. Based on the diagnostic analytics outcome, a troubleshooting of the engine of the autonomous vehicle 1202 may be performed.

In another embodiment, the analytics overlay node 1226 may be the prescriptive analytics overlay node. The prescriptive analytics overlay node includes processing logic that when executed is configured to process the composition of the health status message node M1 to generate one or more recommendations to achieve a desired performance of the autonomous vehicle 1202. The analytics module 240 may be configured to use the analytics overlay node 1226 to execute corresponding set of analytics operations on the composition of the health status message node M1 to generate an analytic insight. Based on the generated analytic insight the analytics module 240 may be configured to generate the analytics outcome AOC1 (for example, a prescriptive analytics outcome). The analytics outcome AOC1 may be indicative of a recommendation to avoid excessive usage of the engine in a first mode of operation. Such recommendation may be provided by the analytics overlay node 1226 based on detection of the pattern of overheating of the engine when in operated in the first mode of operation.

As shown, the health status message node M3 is extended to include an analytics overlay node 1228. In an embodiment, the analytics overlay node 1228 may be descriptive analytics overlay node. The descriptive analytics overlay node includes processing logic that when executed is configured to process composition of the health status message node M3 to determine one or more analytic insights associated with communication of the health status message node M3. The analytics module 240 may be configured to use the analytics overlay node 1228 to execute corresponding set of analytics operations on composition of the health status message node M3. An output of the execution of the set of analytics operations may be indicative of communication of the health status message node M3 being performed in the asynchronous mode. Such asynchronous mode of communication of health message may lead to unwanted delay in error code generation by the OBDU edge 1210 of the autonomous vehicle 1202 that receives the message M4' indicative of the health status of the battery. A publisher overlay node 1230 of the analytics overlay node 1228 may generate and publish the analytics outcome AOC2 (for example, a descriptive analytics outcome) that is indicative of an analytic insight of the asynchronous mode of communication being inefficient for communicating the health status message M3.

Further, as shown the vehicle health message node M5 is extended to include an analytics overlay node 1232. The analytics overlay node 1232 may be the predictive analytics overlay node. The predictive analytics overlay node may include processing logic that when executed is configured to process composition of the vehicle health message node M5 to determine one or more predictions regarding performance of the autonomous vehicle 1202 during the defined time interval. The analytics module 240 may be configured to use the analytics overlay node 1232 to execute corresponding set of analytics operations on the composition of the health message node M5. The analytics module 240 may be further configured to generate the analytics outcome (a predictive analytics outcome) that is indicative of one or more analytic insights associated with health of the autonomous vehicle 1202. The publisher overlay node 1234 may generate and publish the analytics outcome that is indicative of a prediction of a probable deterioration in the health of the engine of the autonomous vehicle 1202 in near future.

It will be apparent to a person skilled in the art that, although message nodes for messages M2' and M4' are not shown in FIG. 12, the message management module 218 generates message nodes for the messages M2' and M4'.

It will be apparent to a person skilled in the art that in different embodiments, the autonomous vehicle 1202 may include additional or different components configured to perform similar or dissimilar operations. Although, the analytics overlays nodes shown in FIG. 12 are the descriptive analytics overlay node, the diagnostic analytics overlay node, the predictive analytics overlay node, and the prescriptive analytics overlay node, in other embodiments, the analytics overlay nodes may be a location analytics overlay node, a text analytics overlay node, or any other type of analytics overlay node without deviating from the scope of the disclosure.

Figure 13:
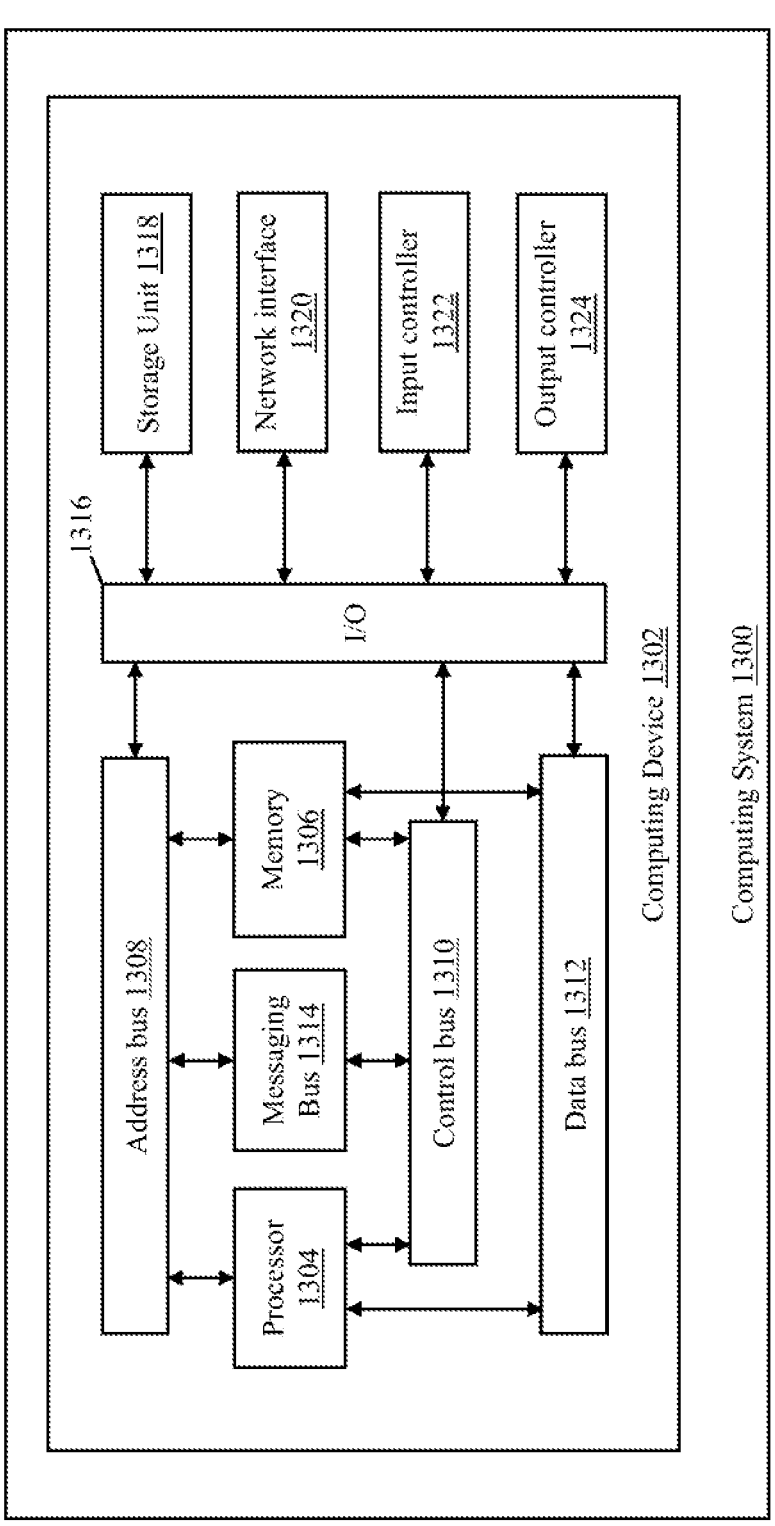
FIG. 13 shows an example computing system for carrying out the methods of the present disclosure, in accordance with an embodiment of the present disclosure.

FIG. 13 shows an example computing system 1300 for carrying out the methods of the present disclosure, in accordance with an embodiment of the present disclosure. Specifically, FIG. 13 shows a block diagram of an embodiment of the computing system 1300 according to example embodiments of the present disclosure.

The computing system 1300 may be configured to perform any of the operations disclosed herein, such as, for example, any of the operations discussed with reference to the functional modules described in relation to FIG. 2. The computing system 1300 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1300 is a distributed system configured to function using multiple computing machines interconnected via a data network or bus system.

The computing system 1300 includes computing devices (such as a computing device 1302). The computing device 1302 includes one or more processors (such as a processor 1304) and a memory 1306. The processor 1304 may be any general-purpose processor(s) configured to execute a set of instructions. For example, the processor 1304 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1304 may be multiple processing units, a single processing core, multiple processing cores, special purpose processing cores, co-processors, or any combination thereof. The processor 1304 may be communicatively coupled to the memory 1306 via an address bus 1308, a control bus 1310, a data bus 1312, and a messaging bus 1314.

The memory 1306 may include non-volatile memories such as a read-only memory (ROM), a programmable read-only memory (PROM), an erasable programmable read-only memory (EPROM), a flash memory, or any other device capable of storing program instructions or data with or without applied power. The memory 1306 may also include volatile memories, such as a random-access memory (RAM), a static random-access memory (SRAM), a dynamic random-access memory (DRAM), and a synchronous dynamic random-access memory (SDRAM). The memory 1306 may include single or multiple memory modules. While the memory 1306 is depicted as part of the computing device 1302, a person skilled in the art will recognize that the memory 1306 can be separate from the computing device 1302.

The memory 1306 may store information that can be accessed by the processor 1304. For instance, the memory 1306 (e.g., one or more non-transitory computer-readable storage mediums, memory devices) may include computer-readable instructions (not shown) that can be executed by the processor 1304. The computer-readable instructions may be software written in any suitable programming language or may be implemented in hardware. Additionally, or alternatively, the computer-readable instructions may be executed in logically and/or virtually separate threads on the processor 1304. For example, the memory 1306 may store instructions (not shown) that when executed by the processor 1304 cause the processor 1304 to perform operations such as any of the operations and functions for which the computing system 1300 is configured, as described herein. Additionally, or alternatively, the memory 1306 may store data (not shown) that can be obtained, received, accessed, written, manipulated, created, and/or stored. The data can include, for instance, the data and/or information described herein in relation to FIGS. 1-12. In some implementations, the computing device 1302 may obtain from and/or store data in one or more memory device(s) that are remote from the computing system 1300.

The computing device 1302 may further include an input/output (I/O) interface 1316 communicatively coupled to the address bus 1308, the control bus 1310, and the data bus 1312. The data bus 1312 and messaging bus 1314 may include a plurality of tunnels that may support parallel execution of messages by the overlay system 202. The I/O interface 1316 is configured to couple to one or more external devices (e.g., to receive and send data from/to one or more external devices). Such external devices, along with the various internal devices, may also be known as peripheral devices. The I/O interface 1316 may include both electrical and physical connections for operably coupling the various peripheral devices to the computing device 1302. The I/O interface 1316 may be configured to communicate data, addresses, and control signals between the peripheral devices and the computing device 1302. The I/O interface 1316 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1316 is configured to implement only one interface or bus technology. Alternatively, the I/O interface 1316 is configured to implement multiple interfaces or bus technologies. The I/O interface 1316 may include one or more buffers for buffering transmissions between one or more external devices, internal devices, the computing device 1302, or the processor 1304. The I/O interface 1316 may couple the computing device 1302 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1316 may couple the computing device 1302 to various output devices, including video displays, speakers, printers, projectors, tactile feedback devices, automation control, robotic components, actuators, motors, fans, solenoids, valves, pumps, transmitters, signal emitters, lights, and so forth.

The computing system 1300 may further include a storage unit 1318, a network interface 1320, an input controller 1322, and an output controller 1324. The storage unit 1318, the network interface 1320, the input controller 1322, and the output controller 1324 are communicatively coupled to the central control unit (e.g., the memory 1306, the address bus 1308, the control bus 1310, and the data bus 1312) via the I/O interface 1316. The network interface 1320 communicatively couples the computing system 1300 to one or more networks such as wide area networks (WAN), local area networks (LAN), intranets, the Internet, wireless access networks, wired networks, mobile networks, telephone networks, optical networks, or combinations thereof. The network interface 1320 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1318 is a computer-readable medium, preferably a non-transitory computer-readable medium, comprising one or more programs, the one or more programs comprising instructions which when executed by the processor 1304 cause the computing system 1300 to perform the method steps of the present disclosure. Alternatively, the storage unit 1318 is a transitory computer-readable medium. The storage unit 1318 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1318 stores one or more operating systems, application programs, program modules, data, or any other information. The storage unit 1318 is part of the computing device 1302. Alternatively, the storage unit 1318 is part of one or more other computing machines that are in communication with the computing device 1302, such as servers, database servers, cloud storage, network attached storage, and so forth.

The input controller 1322 may include suitable logic, circuitry, interfaces, and/or code, executable by the circuitry, that may be configured to control one or more input devices that may be configured to receive an input (the stimulus 230) for the overlay system 202. The output controller 1324 may include suitable logic, circuitry, interfaces, and/or code, executable by the circuitry, that may be configured to control one or more output devices that may be configured to render/output the outcome of the operation executed to process the received input (the stimulus 230).

FIG. 14 is a flowchart 1400 that illustrates a method for facilitating message management using the executable graph-based model 100, in accordance with an embodiment of the present disclosure. Referring to FIG. 14, at 1402, the controller module 206 (e.g., the processing circuitry of the overlay system 202) receives a stimulus (e.g., the stimulus 230) of the overlay system 202. At 1404, the message management module 214 identifies, in the executable graph-based model 100, based on the context of the stimulus 230, (i) one or more analytics overlay nodes to perform analytics associated with the stimulus 230 and (ii) one or more message nodes, of the plurality of message nodes, for which the analytics is to be performed. The one or more analytics overlay nodes comprise at least one analytics overlay node associated with each message node of the one or more message nodes that are to be analyzed. At 1406, the analytics module 240 executes the operation associated with the stimulus 230 using one or more analytics overlay nodes and the one or more message nodes.

The disclosed embodiments encompass numerous advantages including an efficient and seamless approach for facilitation of message management using executable graph-based models. The systems and methods disclosed herein provide for an ability to perform analytics operations at message level. The systems and methods disclosed herein are capable of performing analytics operations on any number of messages. That is to say that the systems and methods disclosed herein allow for dynamic scale-up and scale-down in message analysis. Such analytics of messages is performed in real-time and simultaneously and, hence, exhibits negligible to no wait time. The disclosed systems and methods exhibit consistent performance regardless of a count of messages that are to be analysed. Also, a concept of value shared attributes disclosed herein allows for efficient storage and retrieval of compositions of messages associated with the overlay system 202. Hence, while looking for messages with a specific attribute value, only a vertex node that stores the attribute value is required to be tracked to identify message nodes with that attribute value. Therefore, performing search for messages requires significantly less time. Such analytics and identification of messages may be used to determine the analytic insights for improving performance of the business solution that is implemented by way of the overlay system 202. Also, the message nodes in the executable graph-based model 100 are loaded as and when they are required. The systems and methods disclosed herein allow for the segregation of data and processing logic and hence ensure mutual independence thereof. Application areas of the systems and methods disclosed herein may include, but are not limited to, industrial processes, robotics, home security, automation industry, or the like.

Certain embodiments of the disclosure may be found in the disclosed systems, methods, and non-transitory computer-readable medium, for facilitating message management using executable graph-based models. The methods and systems disclosed herein include various operations performed by the processing circuitry (e.g., the controller module 206, the transaction module, 208, the message management module 214, the analytics module 240, any other element of the overlay system 202, or a combination of two or more elements of the overlay system 202). The overlay system disclosed herein includes the storage element configured to store the executable graph-based model that includes the plurality of message nodes and a first plurality of analytics overlay nodes, with each message node having a first set of analytics overlay nodes associated therewith. Each message node represents a message associated with the overlay system and has a composition that includes data and transactional information associated with the message, Each analytics overlay node, of the first set of analytics overlay nodes, is configured to execute a set of analytics operations on the composition of the corresponding message node. The processing circuitry that is coupled to the storage element and configured to receive a first stimulus associated with the overlay system. The processing circuitry is further configured to identify, in the executable graph-based model, based on a context of the first stimulus, (i) one or more analytics overlay nodes, of the first plurality of analytics overlay nodes, to perform analytics associated with the first stimulus and (ii) one or more message nodes, of the plurality of message nodes, for which the analytics is to be performed. The one or more analytics overlay nodes comprise at least one of the first set of analytics overlay nodes of each message node of the one or more message nodes. The processing circuitry is further configured to execute an operation associated with the first stimulus based on the one or more analytics overlay nodes and the one or more message nodes.

In some embodiments, the executable graph-based model further comprises a first plurality of publisher overlay nodes, with each publisher overlay node being associated with at least one analytics overlay node of the first plurality of analytics overlay nodes, and configured to generate and publish an analytics outcome based on the set of analytics operations executed by the corresponding analytics overlay node. The processing circuitry executes the operation associated with the first stimulus further based on a set of publisher overlay nodes, of the first plurality of publisher overlay nodes, associated with the one or more analytics overlay nodes.

In some embodiments, based on the first stimulus, each of the one or more analytics overlay nodes executes the corresponding set of analytics operations on the composition of the corresponding message node to identify one or more analytic insights indicative of performance of the overlay system. Each publisher overlay node of the set of publisher overlay nodes is coupled to at least one analytics overlay node of the one or more analytics overlay nodes, and generates and publishes the corresponding analytics outcome based on the one or more analytic insights identified by the corresponding analytics overlay node. The execution of the operation associated with the first stimulus corresponds to the generation and publication of the analytics outcome by each publisher overlay node of the set of publisher overlay nodes.

In some embodiments, the executable graph-based model further includes a plurality of non-message nodes and a second plurality of analytics overlay nodes, with each non-message node having a second set of analytics overlay nodes, of the second plurality of analytics overlay nodes, associated therewith. Each analytics overlay node, of the second set of analytics overlay nodes, is configured to execute another set of analytics operations on the corresponding non-message node. The processing circuitry is further configured to identify, in the executable graph-based model, based on the context of the first stimulus, at least one non-message node of the plurality of non-message nodes and at least one analytics overlay node of the second plurality of analytics overlay nodes. The identified analytics overlay node corresponds to an overlay of the identified non-message node. The processing circuitry executes the operation associated with the first stimulus further based on the identified non-message node and the identified analytics overlay node.

In some embodiments, the plurality of non-message nodes comprise at least one of a group consisting of a set of vertex nodes, a set of edge nodes, and a set of generic overlay nodes.

In some embodiments, the executable graph-based model further comprises a second plurality of publisher overlay nodes, with each publisher overlay node being associated with at least one analytics overlay node of the second plurality of analytics overlay nodes, and configured to generate and publish an analytics outcome based on a functionality of the corresponding analytics overlay node. The processing circuitry executes the operation associated with the first stimulus further based on at least one publisher overlay node, of the second plurality of publisher overlay nodes, that is associated with the analytics overlay node, of the second plurality of analytics overlay nodes, identified for stimulus processing of the first stimulus.

In some embodiments, a plurality of messages are associated with the overlay system. The processing circuitry is further configured to generate the executable graph-based model based on the plurality of messages and store the executable graph-based model in the storage element. To generate the executable graph-based model, the processing circuitry is further configured to instantiate one message node for each message associated with the overlay system and instantiate one analytics overlay node as an overlay of the instantiated message node for each set of analytics operations to be performed on the corresponding message node.

In some embodiments, a set of messages associated with the overlay system is correlated such that a first message of the set of messages has a causal association with a second message of the set of messages, and as a result, a first message node, of the plurality of message nodes, representing the first message has a causal association with a second message node, of the plurality of message nodes, representing the second message. The executable graph-based model further comprises a plurality of message edge nodes, with a first message edge node coupling the first message node and the second message node. The first message edge node includes a first message role and a second message role that enable coupling thereof to the first message node and the second message node, respectively, and collectively defines the causal association between the first message node and the second message node. The identification of the one or more message nodes associated with the first stimulus is enabled based on one or more message edge nodes associated with the one or more message nodes, respectively.

In some embodiments, the processing circuitry is further configured to generate the executable graph-based model based on the set of messages and store the executable graph-based model in the storage element. To generate the executable graph-based model, the processing circuitry is further configured to instantiate one message node for each message of the set of messages and instantiate a message edge node between each pair of message nodes that are correlated.

In some embodiments, a first message represented by a first message node of the one or more message nodes identified for stimulus processing of the first stimulus is associated with a set of messages. The set of messages is correlated such that each message of the set of messages has a causal association with at least one other message of the set of messages. The set of messages is generated based on at least a second stimulus received prior to the first stimulus. The processing circuitry is further configured to identify, for the stimulus processing of the first stimulus, a set of message nodes associated with the set of messages and at least one analytics overlay node associated with each message node of the set of message nodes. The processing circuitry executes the operation associated with the first stimulus further based on the identified set of message nodes and the identified analytics overlay node associated with each message node of the set of message nodes.

In some embodiments, the first message node and the set of message nodes are linked by way of one or more correlation identifiers.

In some embodiments, the set of message nodes is instantiated in the executable graph-based model in response to the second stimulus. The set of message nodes includes a parent message node and one or more child message nodes. The processing circuitry is further configured to instantiate the parent message node based on generation of a root message of the set of messages. The root message is generated based on stimulus processing of the second stimulus. The processing circuitry is further configured to instantiate a first set of child message nodes of the one or more child message nodes for a first set of child messages that is generated based on processing of the root message.

In some embodiments, the first message is generated based on processing of the first set of child message nodes.

In some embodiments, the parent message node and the first set of child message nodes instantiated for the first set of child messages are associated with a root correlation ID that is indicative of a transactional operation associated with the root message for executing a first transaction in the executable graph-based model in response to the second stimulus. The association of the root correlation ID with the parent message node and the first set of child message nodes indicates a causal association between the root message and the first set of child messages.

In some embodiments, the processing circuitry is further configured to instantiate a second set of child message nodes of the one or more child message nodes for a second set of child messages generated based on processing of the first set of child messages. The first message is generated based on processing of the second set of child message nodes.

In some embodiments, the parent message node, the first set of child message nodes, and the second set of child message nodes are associated with a root correlation ID that is indicative of a transactional operation associated with the root message for executing a first transaction in the executable graph-based model in response to the second stimulus. The association of the root correlation ID with the parent message node, the first set of child message nodes, and the second set of child message nodes indicates a causal association therebetween. Each of the second set of child message nodes is further associated with a first sub-correlation identifier. The first sub-correlation ID associated with each of the second set of child message nodes is different and is indicative of a distinct transactional operation associated with a corresponding child message of the second set of child messages. The transactional operation is executed for performing a corresponding transaction in the executable graph-based model.

In some embodiments, the composition of each message node of the plurality of message nodes includes at least one of a group consisting of an identifier, one or more correlation identifiers, a user identifier, a name, a category, a topic, a key, a scope field, an execution field, an action field, and data, associated with a corresponding message.

In some embodiments, the composition of each message node of the plurality of message nodes includes at least one of a group consisting of a Created-On timestamp, a Raised-On timestamp, a Received-On timestamp, a Handled-On timestamp, a Processed-On timestamp, a publisher identifier, a subscriber identifier, an allow retry field, a maximum retry allowed field, a current retry count, a retry source identifier, a source identifier, and a source type, associated with a corresponding message.

In some embodiments, the executable graph-based model further comprises a plurality of attribute vertex nodes and a plurality of attribute edge nodes.

In some embodiments, each message node of the plurality of message nodes is associated with one or more attribute vertex nodes of the plurality of attribute vertex nodes with the one or more attribute vertex nodes configured to store the composition of the corresponding message node.

In some embodiments, each message node of the plurality of message nodes is associated with the one or more attribute vertex nodes by way of one or more attribute edge nodes of the plurality of attribute edge nodes, respectively, with the one or more attribute edge nodes defining the association between the one or more vertex nodes and the corresponding message node.

In some embodiments, during stimulus processing of the first stimulus, the processing circuitry is further configured to determine the composition of each message node of the one or more message nodes by tracking the one or more attribute vertex nodes and the one or more attribute edge nodes coupled thereto.

In some embodiments, during stimulus processing of the first stimulus, the processing circuitry is further configured to determine the composition of each message node of the one or more message nodes by tracking the one or more attribute vertex nodes coupled thereto.

In some embodiments, the processing circuitry is further configured to process the composition of each message prior to storage thereof at the one or more attribute vertex nodes associated with the corresponding message node.

In some embodiments, prior to the execution of the operation associated with the first stimulus, the processing circuitry is further configured to load, in the executable graph-based model, at least one of a group consisting of (i) the one or more message nodes, (ii) the one or more vertex nodes associated with each message node of the one or more message nodes, and (iii) the one or more analytics overlay nodes with corresponding data and processing logic.

In some embodiments, at least one analytics overlay node, of the first plurality of analytics overlay nodes, is associated with two or more message nodes of the plurality of message nodes.

In some embodiments, the first plurality of analytics overlay nodes comprise a descriptive analytics overlay node. The descriptive analytics overlay node includes processing logic that when executed is configured to process the composition of each of a set of associated message nodes to determine one or more analytic insights associated with communication of a set of messages represented by the set of associated message nodes.

In some embodiments, the first plurality of analytics overlay nodes comprise a diagnostic analytics overlay node. The diagnostic analytics overlay node includes processing logic that when executed is configured to process the composition of each of a set of associated message nodes to identify one or more patterns that are indicative of a current performance of the overlay system.

In some embodiments, the first plurality of analytics overlay nodes comprise a predictive analytics overlay node. The predictive analytics overlay node includes processing logic that when executed is configured to process the composition of each of a set of associated message nodes to determine one or more predictions regarding performance of the overlay system during a predefined time interval.

In some embodiments, the first plurality of analytics overlay nodes comprise a prescriptive analytics overlay node. The prescriptive analytics overlay node includes processing logic that when executed is configured to process the composition of each of a set of associated message nodes to generate one or more recommendations to achieve a desired performance of the overlay system.

In some embodiments, the first plurality of analytics overlay nodes comprise at least one of a group consisting of a prescriptive analytics overlay node, a predictive analytics overlay node, a descriptive analytics overlay node, and a diagnostic overlay node.

In some embodiments, a first analytics overlay node, of a first message node of the one or more message nodes, inherits a second analytics overlay node of a second message node that is different from the one or more message nodes. The processing circuitry is further configured to load the second analytics overlay node with data and processing logic based on the loading of the first analytics overlay node with data and processing logic.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/ or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating message management using executable graph-based models. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope. Moreover, for example, the present technology/system may achieve the following configurations:

1. An overlay system, comprising:
   a storage element configured to store an executable graph-based model that comprises a plurality of message nodes and a first plurality of analytics overlay nodes, with each message node having a first set of analytics overlay nodes associated therewith, wherein each message node represents a message associated with the overlay system and has a composition that includes data and transactional information associated with the message, and wherein each analytics overlay node, of the first set of analytics overlay nodes, is configured to execute a set of analytics operations on the composition of the corresponding message node; and
   processing circuitry that is coupled to the storage element, and configured to:
      receive a first stimulus associated with the overlay system;
      identify, in the executable graph-based model, based on a context of the first stimulus, (i) one or more analytics overlay nodes, of the first plurality of analytics overlay nodes, to perform analytics associated with the first stimulus and (ii) one or more message nodes, of the plurality of message nodes, for which the analytics is to be performed, wherein the one or more analytics overlay nodes comprise at least one of the first set of analytics overlay nodes of each message node of the one or more message nodes; and
      execute an operation associated with the first stimulus based on the one or more analytics overlay nodes and the one or more message nodes.

2. The overlay system of 1,
   wherein the executable graph-based model further comprises a first plurality of publisher overlay nodes, with each publisher overlay node being associated with at least one analytics overlay node of the first plurality of analytics overlay nodes, and configured to generate and publish an analytics outcome based on the set of analytics operations executed by the corresponding analytics overlay node, and
   wherein the processing circuitry executes the operation associated with the first stimulus further based on a set of publisher overlay nodes, of the first plurality of publisher overlay nodes, associated with the one or more analytics overlay nodes.

3. The overlay system of 2,
   wherein based on the first stimulus, each of the one or more analytics overlay nodes executes the corresponding set of analytics operations on the composition of the corresponding message node to identify one or more analytic insights indicative of performance of the overlay system,
   wherein each publisher overlay node of the set of publisher overlay nodes is coupled to at least one analytics overlay node of the one or more analytics overlay nodes, and generates and publishes the corresponding analytics outcome based on the one or more analytic insights determined by the corresponding analytics overlay node, and
   wherein the execution of the operation associated with the first stimulus corresponds to the generation and publication of the analytics outcome by each publisher overlay node of the set of publisher overlay nodes.

4. The overlay system of 1,
   wherein the executable graph-based model further includes a plurality of non-message nodes and a second plurality of analytics overlay nodes, with each non-message node having a second set of analytics overlay nodes, of the second plurality of analytics overlay nodes, associated therewith,
   wherein each analytics overlay node, of the second set of analytics overlay nodes, is configured to execute another set of analytics operations on the corresponding non-message node,
   wherein the processing circuitry is further configured to identify, in the executable graph-based model, based on the context of the first stimulus, at least one non-message node of the plurality of non-message nodes and at least one analytics overlay node of the second plurality of analytics overlay nodes, wherein the identified analytics overlay node corresponds to an overlay of the identified non-message node, and wherein the processing circuitry executes the operation associated with the first stimulus further based on the identified non-message node and the identified analytics overlay node.

5. The overlay system of 4, wherein the plurality of non-message nodes comprise at least one of a group consisting of a set of vertex nodes, a set of edge nodes, and a set of generic overlay nodes.

6. The overlay system of 4, wherein the executable graph-based model further comprises a second plurality of publisher overlay nodes, with each publisher overlay node being associated with at least one analytics overlay node of the second plurality of analytics overlay nodes, and configured to generate and publish an analytics outcome based on a functionality of the corresponding analytics overlay node, and wherein the processing circuitry executes the operation associated with the first stimulus further based on at least one publisher overlay node, of the second plurality of publisher overlay nodes, that is associated with the analytics overlay node, of the second plurality of analytics overlay nodes, identified for stimulus processing of the first stimulus.

7. The overlay system of 1, wherein a plurality of messages are associated with the overlay system, wherein the processing circuitry is further configured to generate the executable graph-based model based on the plurality of messages and store the executable graph-based model in the storage element, and wherein, to generate the executable graph-based model, the processing circuitry is further configured to instantiate one message node for each message associated with the overlay system and instantiate one analytics overlay node as an overlay of the instantiated message node for each set of analytics operations to be performed on the corresponding message node.

8. The overlay system of 1, wherein a set of messages associated with the overlay system is correlated such that a first message of the set of messages has a causal association with a second message of the set of messages, and as a result, a first message node, of the plurality of message nodes, representing the first message has a causal association with a second message node, of the plurality of message nodes, representing the second message, wherein the executable graph-based model further comprises a plurality of message edge nodes, with a first message edge node coupling the first message node and the second message node, wherein the first message edge node includes a first message role and a second message role that enable coupling thereof to the first message node and the second message node, respectively, and collectively defines the causal association between the first message node and the second message node, and wherein the identification of the one or more message nodes associated with the first stimulus is enabled based on one or more message edge nodes associated with the one or more message nodes.

9. The overlay system of 8, wherein the processing circuitry is further configured to generate the executable graph-based model based on the set of messages and store the executable graph-based model in the storage element, and wherein, to generate the executable graph-based model, the processing circuitry is further configured to instantiate one message node for each message of the set of messages and instantiate a message edge node between each pair of message nodes that are correlated.

10. The overlay system of 1, wherein a first message represented by a first message node of the one or more message nodes identified for stimulus processing of the first stimulus is associated with a set of messages, wherein the set of messages is correlated such that each message of the set of messages has a causal association with at least one other message of the set of messages, wherein the set of messages is generated based on at least a second stimulus received prior to the first stimulus, wherein the processing circuitry is further configured to identify, for the stimulus processing of the first stimulus, a set of message nodes associated with the set of messages and at least one analytics overlay node associated with each message node of the set of message nodes, and wherein the processing circuitry executes the operation associated with the first stimulus further based on the identified set of message nodes and the identified analytics overlay node associated with each message node of the set of message nodes.

11. The overlay system of 10, wherein the first message node and the set of message nodes are linked by way of one or more correlation identifiers.

12. The overlay system of 10, wherein the set of message nodes is instantiated in the executable graph-based model in response to the second stimulus, where the set of message nodes includes a parent message node and one or more child message nodes, and wherein the processing circuitry is further configured to (i) instantiate the parent message node based on generation of a root message of the set of messages, where the root message is generated based on stimulus processing of the second stimulus, and (ii) instantiate a first set of child message nodes of the one or more child message nodes for a first set of child messages that is generated based on processing of the root message.

13. The overlay system of 12, wherein the first message is generated based on processing of the first set of child message nodes.

14. The overlay system of 12, wherein the parent message node and the first set of child message nodes instantiated for the first set of child messages are associated with a root correlation identifier that is indicative of a transactional operation associated with the root message for executing a first transaction in the executable graph-based model in response to the second stimulus, and wherein the association of the root correlation identifier with the parent message node and the first set of child message nodes indicates a causal association between the root message and the first set of child messages.

15. The overlay system of 12, wherein the processing circuitry is further configured to instantiate a second set of child message nodes of the one or more child message nodes for a second set of child messages generated based on processing of the first set of child messages, and wherein the first message is generated based on processing of the second set of child message nodes.

16. The overlay system of 15,
    wherein the parent message node, the first set of child message nodes, and the second set of child message nodes are associated with a root correlation identifier that is indicative of a transactional operation associated with the root message for executing a first transaction in the executable graph-based model in response to the second stimulus,
    wherein the association of the root correlation identifier with the parent message node, the first set of child message nodes, and the second set of child message nodes indicates a causal association therebetween,
    wherein each of the second set of child message nodes is further associated with a first sub-correlation identifier, and
    wherein the first sub-correlation identifier associated with each of the second set of child message nodes is different and is indicative of a distinct transactional operation associated with a corresponding child message of the second set of child messages, where the transactional operation is executed for performing a corresponding transaction in the executable graph-based model.

17. The overlay system of 1, wherein the composition of each message node of the plurality of message nodes includes at least one of a group consisting of an identifier, one or more correlation identifiers, a user identifier, a name, a category, a topic, a key, a scope, an execution, an action, and data, associated with a corresponding message.

18. The overlay system of 1, wherein the composition of each message node of the plurality of message nodes includes at least one of a group consisting of a Created-On timestamp, a Raised-On timestamp, a Received-On timestamp, a Handled-On timestamp, a Processed-On timestamp, a publisher identifier, a subscriber identifier, an allow retry, a maximum retry allowed attribute, a current retry count, a retry source identifier, a source identifier, and a source type, associated with a corresponding message.

19. The overlay system of 1, wherein the executable graph-based model further comprises a plurality of attribute vertex nodes and a plurality of attribute edge nodes.

20. The overlay system of 19, wherein each message node of the plurality of message nodes is associated with one or more attribute vertex nodes of the plurality of attribute vertex nodes, with the one or more attribute vertex nodes configured to store the composition of the corresponding message node.

21. The overlay system of 20, wherein each message node of the plurality of message nodes is associated with the one or more attribute vertex nodes by way of one or more attribute edge nodes of the plurality of attribute edge nodes, respectively, with the one or more attribute edge nodes defining the association between the one or more vertex nodes and the corresponding message node.

22. The overlay system of 21, wherein during stimulus processing of the first stimulus, the processing circuitry is further configured to determine the composition of each message node of the one or more message nodes by tracking the one or more attribute vertex nodes and the one or more attribute edge nodes coupled thereto.

23. The overlay system of 20, wherein during stimulus processing of the first stimulus, the processing circuitry is further configured to determine the composition of each message node of the one or more message nodes by tracking the one or more attribute vertex nodes coupled thereto.

24. The overlay system of 20, wherein the processing circuitry is further configured to process the composition of each message prior to storage thereof at the one or more attribute vertex nodes associated with the corresponding message node.

25. The overlay system of 20, wherein prior to the execution of the operation associated with the first stimulus, the processing circuitry is further configured to load, in the executable graph-based model, at least one of a group consisting of (i) the one or more message nodes, (ii) the one or more vertex nodes associated with each message node of the one or more message nodes, and (iii) the one or more analytics overlay nodes with corresponding data and processing logic.

26. The overlay system of 1, wherein at least one analytics overlay node, of the first plurality of analytics overlay nodes, is associated with two or more message nodes of the plurality of message nodes.

27. The overlay system of 1, wherein the first plurality of analytics overlay nodes comprise a descriptive analytics overlay node, and wherein the descriptive analytics overlay node includes processing logic that when executed is configured to process the composition of each of a set of associated message nodes to determine one or more analytic insights associated with communication of a set of messages represented by the set of associated message nodes.

28. The overlay system of 1, wherein the first plurality of analytics overlay nodes comprise a diagnostic analytics overlay node, and wherein the diagnostic analytics overlay node includes processing logic that when executed is configured to process the composition of each of a set of associated message nodes to identify one or more patterns that are indicative of a current performance of the overlay system.

29. The overlay system of 1, wherein the first plurality of analytics overlay nodes comprise a predictive analytics overlay node, and wherein the predictive analytics overlay node includes processing logic that when executed is configured to process the composition of each of a set of associated message nodes to determine one or more predictions regarding performance of the overlay system during a predefined time interval.

30. The overlay system of 1, wherein the first plurality of analytics overlay nodes comprise a prescriptive analytics overlay node, and wherein the prescriptive analytics overlay node includes processing logic that when executed is configured to process the composition of each of a set of associated message nodes to generate one or more recommendations to achieve a desired performance of the overlay system.

31. The overlay system of 1, wherein the first plurality of analytics overlay nodes comprise at least one of a group consisting of a prescriptive analytics overlay node, a predictive analytics overlay node, a descriptive analytics overlay node, and a diagnostic overlay node.

32. The overlay system of 1, wherein a first analytics overlay node, of a first message node of the one or more message nodes, inherits a second analytics overlay node of a second message node that is different from the one or more message nodes, and wherein the processing circuitry is further configured to load the second analytics overlay node with data and processing logic based on the loading of the first analytics overlay node with data and processing logic.

33. A method, comprising:
  receiving, by processing circuitry of an overlay system, a stimulus associated with the overlay system,
    wherein an executable graph-based model is stored in a storage element of the overlay system, and
    wherein the executable graph-based model comprises a plurality of message nodes and a first plurality of overlay nodes, with each message node having a first set of analytics overlay nodes associated therewith, wherein each message node represents a message associated with the overlay system and has a composition that includes data and transactional information associated with the message, and wherein each analytics overlay node, of the first set of analytics overlay nodes, is configured to execute a set of analytic operations on the composition of the corresponding message node;
  identifying, in the executable graph-based model, based on a context of the stimulus, the (i) one or more analytics overlay nodes, of the first plurality of analytics overlay nodes, to perform analytics associated with the stimulus and (ii) one or more message nodes, of the plurality of message nodes, for which the analytics is to be performed, wherein the one or more analytics overlay nodes comprise at least one of the first set of analytics overlay nodes of each message node of the one or more message nodes; and
  executing an operation associated with the stimulus based on the one or more analytics overlay nodes and the one or more message nodes.

What is claimed is:
1. An overlay system, comprising:
  a storage element configured to store an executable graph-based model that comprises a plurality of message nodes and a first plurality of analytics overlay nodes, with each message node having a first set of analytics overlay nodes associated therewith, wherein each message node represents a message of a plurality of messages and has a composition that includes data and transactional information associated with the message, wherein the plurality of messages correspond to messages communicated between a plurality of modules of the overlay system, and wherein each analytics overlay node, of the first set of analytics overlay nodes, is configured to execute a set of analytics operations on the composition of the corresponding message node; and
  processing circuitry that is coupled to the storage element, and configured to:
    generate the executable graph-based model based on the plurality of messages;

instantiate, for the generation of the executable graph-based model, one message node for each message of the plurality of messages, wherein the generated executable graph-based model includes the plurality of message nodes based on the instantiation;
    store the executable graph-based model in the storage element;
    receive a first stimulus associated with the overlay system;
    identify, in the executable graph-based model, based on a context of the first stimulus, (i) one or more analytics overlay nodes, of the first plurality of analytics overlay nodes, to perform analytics associated with the first stimulus and (ii) one or more message nodes, of the plurality of message nodes, for which the analytics is to be performed, wherein the one or more analytics overlay nodes comprise at least one of the first set of analytics overlay nodes of each message node of the one or more message nodes; and
    execute an operation associated with the first stimulus based on the one or more analytics overlay nodes and the one or more message nodes.

2. The overlay system of claim 1,
  wherein the executable graph-based model further comprises a first plurality of publisher overlay nodes, with each publisher overlay node being associated with at least one analytics overlay node of the first plurality of analytics overlay nodes, and configured to generate and publish an analytics outcome based on the set of analytics operations executed by the corresponding analytics overlay node, and
  wherein the processing circuitry executes the operation associated with the first stimulus further based on a set of publisher overlay nodes, of the first plurality of publisher overlay nodes, associated with the one or more analytics overlay nodes.

3. The overlay system of claim 2,
  wherein based on the first stimulus, each of the one or more analytics overlay nodes executes the corresponding set of analytics operations on the composition of the corresponding message node to determine one or more analytic insights indicative of performance of the overlay system,
  wherein each publisher overlay node of the set of publisher overlay nodes is coupled to at least one analytics overlay node of the one or more analytics overlay nodes, and generates and publishes the corresponding analytics outcome based on the one or more analytic insights determined by the corresponding analytics overlay node, and
  wherein the execution of the operation associated with the first stimulus corresponds to the generation and publication of the analytics outcome by each publisher overlay node of the set of publisher overlay nodes.

4. The overlay system of claim 1,
  wherein the executable graph-based model further includes a plurality of non-message nodes and a second plurality of analytics overlay nodes, with each non-message node having a second set of analytics overlay nodes, of the second plurality of analytics overlay nodes, associated therewith,
  wherein each analytics overlay node, of the second set of analytics overlay nodes, is configured to execute another set of analytics operations on the corresponding non-message node, wherein the processing circuitry is further configured to identify, in the executable graph-based model, based on the context of the first stimulus, at least one non-message node of the plurality of non-message nodes and at least one analytics overlay node of the second plurality of analytics overlay nodes, wherein the identified analytics overlay node corresponds to an overlay of the identified non-message node, and wherein the processing circuitry executes the operation associated with the first stimulus further based on the identified non-message node and the identified analytics overlay node.

5. The overlay system of claim 4, wherein the plurality of non-message nodes comprise at least one of a group consisting of a set of vertex nodes, a set of edge nodes, and a set of generic overlay nodes.

6. The overlay system of claim 4, wherein the executable graph-based model further comprises a second plurality of publisher overlay nodes, with each publisher overlay node being associated with at least one analytics overlay node of the second plurality of analytics overlay nodes, and configured to generate and publish an analytics outcome based on a functionality of the corresponding analytics overlay node, and wherein the processing circuitry executes the operation associated with the first stimulus further based on at least one publisher overlay node, of the second plurality of publisher overlay nodes, that is associated with the analytics overlay node, of the second plurality of analytics overlay nodes, identified for stimulus processing of the first stimulus.

7. The overlay system of claim 1, wherein, for the generation of the executable graph-based model, the processing circuitry is further configured to instantiate one analytics overlay node as an overlay of the instantiated message node for each set of analytics operations to be performed on the corresponding message node.

8. The overlay system of claim 1, wherein a set of messages, of the plurality of messages, associated with the overlay system is correlated such that a first message of the set of messages has a causal association with a second message of the set of messages, and as a result, a first message node, of the plurality of message nodes, representing the first message has a causal association with a second message node, of the plurality of message nodes, representing the second message, wherein the executable graph-based model further comprises a plurality of message edge nodes, with a first message edge node coupling the first message node and the second message node, wherein the first message edge node includes a first message role and a second message role that enable coupling thereof to the first message node and the second message node, respectively, and collectively defines the causal association between the first message node and the second message node, and wherein the identification of the one or more message nodes associated with the first stimulus is enabled based on one or more message edge nodes associated with the one or more message nodes.

9. The overlay system of claim 8, wherein for the generation of the executable graph-based model, the processing circuitry is further configured to instantiate a message edge node between each pair of message nodes that are correlated.

10. The overlay system of claim 1, wherein a first message represented by a first message node of the one or more message nodes identified for stimulus processing of the first stimulus is associated with a set of messages of the plurality of messages, wherein the set of messages is correlated such that each message of the set of messages has a causal association with at least one other message of the set of messages, wherein the set of messages is generated based on at least a second stimulus received prior to the first stimulus, wherein the processing circuitry is further configured to identify, for the stimulus processing of the first stimulus, a set of message nodes associated with the set of messages and at least one analytics overlay node associated with each message node of the set of message nodes, and wherein the processing circuitry executes the operation associated with the first stimulus further based on the identified set of message nodes and the identified analytics overlay node associated with each message node of the set of message nodes.

11. The overlay system of claim 10, wherein the first message node and the set of message nodes are linked by way of one or more correlation identifiers.

12. The overlay system of claim 10, wherein the set of message nodes is instantiated in the executable graph-based model in response to the second stimulus, where the set of message nodes includes a parent message node and one or more child message nodes, and wherein the processing circuitry is further configured to (i) instantiate the parent message node based on generation of a root message of the set of messages, where the root message is generated based on stimulus processing of the second stimulus, and (ii) instantiate a first set of child message nodes of the one or more child message nodes for a first set of child messages that is generated based on processing of the root message.

13. The overlay system of claim 12, wherein the first message is generated based on processing of the first set of child message nodes.

14. The overlay system of claim 12, wherein the parent message node and the first set of child message nodes instantiated for the first set of child messages are associated with a root correlation identifier that is indicative of a transactional operation associated with the root message for executing a first transaction in the executable graph-based model in response to the second stimulus, and wherein the association of the root correlation identifier with the parent message node and the first set of child message nodes indicates a causal association between the root message and the first set of child messages.

15. The overlay system of claim 12, wherein the processing circuitry is further configured to instantiate a second set of child message nodes of the one or more child message nodes for a second set of child messages generated based on processing of the first set of child messages, and wherein the first message is generated based on processing of the second set of child message nodes.

16. The overlay system of claim 15, wherein the parent message node, the first set of child message nodes, and the second set of child message nodes are associated with a root correlation identifier that is indicative of a transactional operation associated with the root message for executing a first transaction in the executable graph-based model in response to the second stimulus, wherein the association of the root correlation identifier with the parent message node, the first set of child message nodes, and the second set of child message nodes indicates a causal association therebetween, wherein each of the second set of child message nodes is further associated with a first sub-correlation identifier, and wherein the first sub-correlation identifier associated with each of the second set of child message nodes is different and is indicative of a distinct transactional operation associated with a corresponding child message of the second set of child messages, where the transactional operation is executed for performing a corresponding transaction in the executable graph-based model.

17. The overlay system of claim 1, wherein the composition of each message node of the plurality of message nodes includes at least one of a group consisting of an identifier, one or more correlation identifiers, a user identifier, a name, a category, a topic, a key, a scope, an execution, an action, and data, associated with a corresponding message.

18. The overlay system of claim 1, wherein the composition of each message node of the plurality of message nodes includes at least one of a group consisting of a Created-On timestamp, a Raised-On timestamp, a Received-On timestamp, a Handled-On timestamp, a Processed-On timestamp, a publisher identifier, a subscriber identifier, an allow retry, a maximum retry allowed attribute, a current retry count, a retry source identifier, a source identifier, and a source type, associated with a corresponding message.

19. The overlay system of claim 1, wherein the executable graph-based model further comprises a plurality of attribute vertex nodes and a plurality of attribute edge nodes.

20. The overlay system of claim 19, wherein each message node of the plurality of message nodes is associated with one or more attribute vertex nodes of the plurality of attribute vertex nodes, with the one or more attribute vertex nodes configured to store the composition of the corresponding message node.

* * * * *